US009591841B2

(12) United States Patent
Schoenike

(10) Patent No.: US 9,591,841 B2
(45) Date of Patent: Mar. 14, 2017

(54) FLY-FISHING FLOAT OR STRIKE INDICATOR AND ATTACHMENT METHODS

(71) Applicant: Larry Schoenike, Sun Valley, ID (US)

(72) Inventor: Larry Schoenike, Sun Valley, ID (US)

(*) Notice: Subject to any disclaimer, the term of this patent is extended or adjusted under 35 U.S.C. 154(b) by 136 days.

(21) Appl. No.: 14/277,025

(22) Filed: May 13, 2014

(65) Prior Publication Data

US 2015/0013211 A1   Jan. 15, 2015

(51) Int. Cl.
*A01K 93/00*   (2006.01)
*A01K 91/03*   (2006.01)
*A01K 91/16*   (2006.01)

(52) U.S. Cl.
CPC .............. *A01K 93/00* (2013.01); *A01K 91/03* (2013.01); *A01K 91/16* (2013.01)

(58) Field of Classification Search
CPC ........ A01K 93/00; A01K 97/12; A01K 91/16; A01K 91/14; A01K 91/12
USPC ................ 43/44.9, 44.91, 44.87, 43.1, 44.98
See application file for complete search history.

(56) References Cited

U.S. PATENT DOCUMENTS

| 171,890 | A | * | 1/1876 | Wagner | F16G 11/00 43/43.1 |
| 231,417 | A | * | 8/1880 | Foote | A01K 93/00 43/44.9 |
| 441,447 | A | * | 11/1890 | Stahl | A01K 93/00 43/43.1 |
| 668,254 | A | * | 2/1901 | Dickinson | A01K 93/00 43/44.9 |
| 822,694 | A | * | 6/1906 | Shepherd | A01K 95/00 43/44.91 |
| 943,506 | A | * | 12/1909 | Wooton | A01K 93/00 43/44.91 |
| 971,420 | A | * | 9/1910 | Tannert | A63H 1/00 43/44.91 |
| 1,193,912 | A | * | 8/1916 | Maire | A01K 93/00 43/44.9 |

(Continued)

FOREIGN PATENT DOCUMENTS

| FR | 2722367 A1 | * | 1/1996 | ............ A01K 93/00 |
| GB | 1371230 A | * | 10/1974 | ............ A01K 93/00 |

(Continued)

OTHER PUBLICATIONS

Translation of JP 10-028504.*

(Continued)

*Primary Examiner* — Darren W Ark
(74) *Attorney, Agent, or Firm* — Pedersen and Company, PLLC; Ken J. Pedersen; Barbara S. Pedersen

(57) ABSTRACT

A fly fishing float and/or strike indicator is attached by an interference fit to a leader, by sliding the float up the leader to a thicker-diameter portion of the leader for a tight fit, and preferably a leader-compressing fit, between the leader and an axial bore in the float. A bore surface, that is non-compressible and/or less compressible than the leader, may be supplied as an insert around which a buoyant main body of the float is formed. The insert may also have features that prevent separation of the main body from the insert and that help transmit force on the main body to the bore surface for quick and efficient securement of the float to the leader by the interference fit.

29 Claims, 19 Drawing Sheets

(56) References Cited

U.S. PATENT DOCUMENTS

| | | | | |
|---|---|---|---|---|
| 1,480,655 A | * | 1/1924 | Bennett | A01K 93/00 43/43.1 |
| 1,489,088 A | * | 4/1924 | McMindes | A01K 93/00 43/44.9 |
| 1,618,100 A | * | 2/1927 | Lowry | A01K 95/00 43/44.9 |
| 1,848,600 A | * | 3/1932 | Best | A01K 95/00 43/43.1 |
| 1,883,574 A | * | 10/1932 | Cleeland | A01K 95/00 43/44.9 |
| 1,991,253 A | * | 2/1935 | Kerns | A01K 91/06 43/44.9 |
| D107,418 S | * | 12/1937 | Ganaway | 43/44.9 |
| 2,184,187 A | * | 12/1939 | Hildebrandt | A01K 91/16 43/44.98 |
| 2,186,281 A | * | 1/1940 | Cochran | A01K 93/00 43/44.95 |
| 2,241,367 A | * | 5/1941 | Sarff | A01K 85/02 43/43.15 |
| 2,315,322 A | * | 3/1943 | Fenley | A01K 93/00 43/44.9 |
| 2,500,078 A | * | 3/1950 | Ingram | A01K 93/00 43/44.91 |
| 2,556,932 A | * | 6/1951 | Morrissey | A01K 93/00 43/44.91 |
| 2,591,558 A | * | 4/1952 | Kramer | A01K 93/00 43/44.9 |
| 2,599,973 A | * | 6/1952 | Bujaky | A01K 95/00 43/44.91 |
| 2,693,049 A | * | 11/1954 | Atton | A01K 93/00 43/44.9 |
| 2,713,742 A | * | 7/1955 | Holdaway | A01K 85/00 43/44.81 |
| 2,726,474 A | * | 12/1955 | Soskice | A01K 93/00 43/43.14 |
| 2,741,864 A | * | 4/1956 | Shotton | A01K 93/00 43/44.9 |
| 2,754,616 A | * | 7/1956 | Law | A01K 93/00 43/44.91 |
| 2,770,910 A | * | 11/1956 | Gehrig | A01K 95/005 43/44.9 |
| 2,807,907 A | * | 10/1957 | Brite | A01K 93/00 43/44.91 |
| 2,827,731 A | * | 3/1958 | Haynes | A01K 93/00 43/44.9 |
| 2,860,443 A | * | 11/1958 | Robinson | A01K 83/06 43/44.4 |
| 2,874,511 A | * | 2/1959 | Hettrick | A01K 93/00 43/44.87 |
| 2,881,551 A | * | 4/1959 | Atton | A01K 93/00 43/44.9 |
| 2,883,785 A | * | 4/1959 | Croft | A01K 85/16 43/42.09 |
| 2,888,771 A | * | 6/1959 | Stephens | A01K 93/00 43/44.91 |
| 2,890,510 A | * | 6/1959 | Spalding | A01K 91/04 43/44.93 |
| 2,984,931 A | * | 5/1961 | Shaw | A01K 97/18 43/44.91 |
| 2,992,508 A | * | 7/1961 | Schmidt | A01K 93/00 43/44.91 |
| 3,023,535 A | * | 3/1962 | Holka | A01K 91/04 43/43.1 |
| 3,029,544 A | * | 4/1962 | Dimatteo | A01K 91/02 43/44.9 |
| 3,084,470 A | * | 4/1963 | Orvel | A01K 93/00 43/44.91 |
| 3,091,050 A | * | 5/1963 | Metzler | A01K 95/00 43/44.91 |
| 3,104,488 A | * | 9/1963 | Hicks | A01K 91/06 43/44.91 |
| 3,192,662 A | * | 7/1965 | Hoyle | A01K 95/00 43/44.91 |
| 3,404,482 A | * | 10/1968 | Maske | A01K 97/24 43/44.9 |
| 3,453,769 A | * | 7/1969 | James | A01K 91/16 43/44.98 |
| 3,464,140 A | * | 9/1969 | Carabasse | A01K 87/002 43/44.98 |
| 3,628,279 A | * | 12/1971 | Halone | A01K 97/24 43/44.9 |
| 3,701,212 A | * | 10/1972 | Gilliam | A01K 95/00 43/44.9 |
| 3,717,907 A | * | 2/1973 | Klein | A01K 91/04 43/44.9 |
| 3,733,734 A | * | 5/1973 | Hysaw | A01K 93/00 43/44.9 |
| 3,758,979 A | * | 9/1973 | Martuch | A01K 91/16 43/44.98 |
| 3,765,118 A | * | 10/1973 | Reitler | A01K 91/08 43/43.12 |
| 3,778,871 A | * | 12/1973 | Ratte, Jr. | A01K 91/04 43/44.87 |
| 3,782,025 A | * | 1/1974 | Kochevar | A01K 95/005 43/44.9 |
| 3,798,825 A | * | 3/1974 | Popeil | A01K 93/00 43/44.9 |
| 3,805,439 A | * | 4/1974 | Krengel | A01K 95/00 43/43.1 |
| 3,831,309 A | * | 8/1974 | Martuch | A01K 91/16 43/44.98 |
| 3,834,061 A | * | 9/1974 | Klein | A01K 91/047 43/44.9 |
| 3,857,645 A | * | 12/1974 | Klein | A01K 91/047 43/44.9 |
| 3,864,865 A | * | 2/1975 | Swisher | A01K 91/16 43/44.98 |
| 3,871,123 A | * | 3/1975 | Olson | A01K 91/00 43/44.98 |
| 3,885,339 A | * | 5/1975 | Herkner | A01K 85/00 43/42.36 |
| 3,947,990 A | * | 4/1976 | Johnson | A01K 93/00 43/44.9 |
| 3,988,852 A | * | 11/1976 | Klein | A01K 91/04 43/44.91 |
| 4,048,744 A | * | 9/1977 | Chandler | A01K 91/12 43/44.98 |
| 4,090,463 A | * | 5/1978 | Soderberg | B63B 21/20 43/44.91 |
| 4,117,619 A | * | 10/1978 | Stevenson | A01K 95/00 43/43.1 |
| 4,145,833 A | * | 3/1979 | Ratte | A01K 95/00 43/44.91 |
| 4,165,578 A | * | 8/1979 | Klein | A01K 91/04 43/44.8 |
| 4,177,598 A | * | 12/1979 | Jolley | A01K 85/00 43/44.93 |
| 4,205,477 A | * | 6/1980 | Fajt, Jr. | A01K 93/00 43/44.91 |
| 4,215,505 A | * | 8/1980 | Henze | A01K 91/08 43/44.9 |
| 4,359,836 A | * | 11/1982 | Yuji | A01K 93/00 43/44.9 |
| 4,418,492 A | * | 12/1983 | Rayburn | A01K 93/00 43/44.9 |
| 4,459,775 A | * | 7/1984 | Ratte | A01K 95/00 43/44.91 |
| 4,472,903 A | * | 9/1984 | Hutson | A01K 95/00 43/44.91 |
| 4,563,831 A | * | 1/1986 | Gibney | A01K 93/00 43/44.91 |
| 4,604,821 A | * | 8/1986 | Moser | A01K 91/047 43/44.98 |
| 4,610,104 A | * | 9/1986 | Garcia | A01K 93/00 43/44.9 |
| 4,615,136 A | * | 10/1986 | Bank | A01K 95/00 43/44.91 |

(56) References Cited

U.S. PATENT DOCUMENTS

| | | | | |
|---|---|---|---|---|
| 4,633,609 A * | 1/1987 | Brown | A01K 91/04 | |
| | | | 43/43.1 | |
| 4,644,681 A * | 2/1987 | Hutson | A01K 93/00 | |
| | | | 43/44.91 | |
| 4,649,663 A * | 3/1987 | Strickland | A01K 95/00 | |
| | | | 43/44.9 | |
| 4,691,468 A * | 9/1987 | Fernbach | A01K 95/02 | |
| | | | 43/44.9 | |
| 4,696,125 A * | 9/1987 | Rayburn | A01K 93/00 | |
| | | | 43/44.9 | |
| 4,727,676 A * | 3/1988 | Runyan | A01K 91/08 | |
| | | | 43/43.1 | |
| 4,796,377 A * | 1/1989 | Hosegood | A01K 95/00 | |
| | | | 43/43.1 | |
| 4,803,798 A * | 2/1989 | Hannah | A01K 95/00 | |
| | | | 43/44.91 | |
| 4,823,495 A * | 4/1989 | Camilleri | A01K 85/14 | |
| | | | 43/42.36 | |
| 4,837,966 A * | 6/1989 | Bethel | A01K 95/00 | |
| | | | 43/44.9 | |
| 4,864,767 A * | 9/1989 | Drosdak | A01K 91/047 | |
| | | | 43/43.1 | |
| 4,987,697 A * | 1/1991 | Klein | A01K 91/04 | |
| | | | 43/44.83 | |
| 5,014,459 A * | 5/1991 | Sublet | A01K 91/047 | |
| | | | 43/43.1 | |
| 5,042,190 A * | 8/1991 | Calvin | A01K 93/00 | |
| | | | 43/44.91 | |
| 5,157,860 A * | 10/1992 | Clark | A01K 95/00 | |
| | | | 43/44.91 | |
| 5,165,195 A * | 11/1992 | Matsui | A01K 93/00 | |
| | | | 43/44.9 | |
| 5,197,220 A * | 3/1993 | Gibbs | A01K 85/16 | |
| | | | 43/44.9 | |
| 5,207,016 A * | 5/1993 | Pate | A01K 85/00 | |
| | | | 43/44.9 | |
| 5,216,831 A * | 6/1993 | Halterman, Jr. | A01K 93/02 | |
| | | | 43/44.91 | |
| 5,239,770 A * | 8/1993 | Kohus | A01K 95/00 | |
| | | | 43/44.91 | |
| 5,279,066 A * | 1/1994 | Camera | A01K 91/06 | |
| | | | 43/44.9 | |
| 5,359,804 A * | 11/1994 | Burns | A01K 93/00 | |
| | | | 43/44.91 | |
| 5,377,444 A * | 1/1995 | Gibney, Sr. | A01K 93/00 | |
| | | | 43/44.91 | |
| 5,381,622 A * | 1/1995 | Tregre | A01K 85/01 | |
| | | | 43/44.9 | |
| 5,388,368 A * | 2/1995 | Lawrence | A01K 91/03 | |
| | | | 43/44.9 | |
| 5,456,041 A * | 10/1995 | Schoeberlein | A01K 93/00 | |
| | | | 43/44.91 | |
| 5,459,959 A * | 10/1995 | Paradis | A01K 97/12 | |
| | | | 43/44.91 | |
| 5,469,652 A * | 11/1995 | Drosdak | A01K 91/047 | |
| | | | 43/44.98 | |
| 5,555,668 A * | 9/1996 | Brasseur | A01K 91/053 | |
| | | | 43/43.1 | |
| 5,661,922 A * | 9/1997 | Bonomo | A01K 85/02 | |
| | | | 43/44.9 | |
| 5,678,351 A * | 10/1997 | Halterman, Jr. | A01K 91/12 | |
| | | | 43/43.1 | |
| 5,718,077 A * | 2/1998 | Meinel | A01K 91/16 | |
| | | | 43/44.98 | |
| 5,758,451 A * | 6/1998 | Wolfe | A01K 93/00 | |
| | | | 43/44.91 | |
| 5,784,828 A * | 7/1998 | Thompson | A01K 95/00 | |
| | | | 43/44.9 | |
| 5,784,829 A * | 7/1998 | Latta | A01K 93/00 | |
| | | | 43/44.91 | |
| 5,845,430 A * | 12/1998 | Nakano | A01K 91/16 | |
| | | | 43/44.98 | |
| 5,852,894 A * | 12/1998 | Shannon | A01K 93/00 | |
| | | | 43/44.9 | |
| 5,887,378 A * | 3/1999 | Rhoten | A01K 85/14 | |
| | | | 43/42.03 | |
| 6,009,659 A * | 1/2000 | Shannon | A01K 93/00 | |
| | | | 43/44.91 | |
| 6,125,574 A * | 10/2000 | Ganaja | A01K 91/03 | |
| | | | 43/44.9 | |
| 6,170,192 B1 * | 1/2001 | Nakano | A01K 91/16 | |
| | | | 43/44.98 | |
| 6,421,950 B1 * | 7/2002 | Constantin | A01K 91/12 | |
| | | | 43/44.98 | |
| D462,413 S * | 9/2002 | Teegarden | D22/126 | |
| 6,467,214 B1 * | 10/2002 | DeFrisco | A01K 93/00 | |
| | | | 43/44.9 | |
| 6,519,894 B1 * | 2/2003 | Geary | A01K 91/06 | |
| | | | 43/44.9 | |
| 6,745,511 B1 * | 6/2004 | Falconer | A01K 91/02 | |
| | | | 43/44.9 | |
| 6,880,289 B1 * | 4/2005 | Yin | A01K 91/047 | |
| | | | 43/44.98 | |
| 6,910,296 B2 * | 6/2005 | Blette | A01K 91/047 | |
| | | | 43/43.1 | |
| 7,003,911 B2 * | 2/2006 | Schoenike | A01K 93/02 | |
| | | | 43/44.91 | |
| 7,162,830 B2 * | 1/2007 | Sims | A01K 95/02 | |
| | | | 43/44.9 | |
| 7,475,510 B2 * | 1/2009 | Franklin | A01K 91/03 | |
| | | | 43/44.91 | |
| 7,490,433 B2 * | 2/2009 | Schoenike | A01K 93/02 | |
| | | | 43/44.91 | |
| 7,494,162 B1 * | 2/2009 | Howell | A01K 91/047 | |
| | | | 289/17 | |
| 7,546,704 B1 * | 6/2009 | Canales | A01K 91/06 | |
| | | | 43/44.9 | |
| 7,610,715 B2 * | 11/2009 | Cowin | A01K 93/02 | |
| | | | 43/44.91 | |
| 7,614,179 B2 * | 11/2009 | Kavanaugh | A01K 91/03 | |
| | | | 43/44.91 | |
| 7,654,032 B1 * | 2/2010 | Fricke | A01K 83/06 | |
| | | | 43/44.91 | |
| 7,861,457 B2 * | 1/2011 | Blette | A01K 91/047 | |
| | | | 43/44.9 | |
| 7,877,924 B2 * | 2/2011 | Schoenike | A01K 91/16 | |
| | | | 43/44.91 | |
| 8,276,311 B2 * | 10/2012 | Cowin | A01K 91/03 | |
| | | | 43/44.91 | |
| 8,341,871 B2 * | 1/2013 | Kavanaugh | A01K 93/00 | |
| | | | 43/44.9 | |
| 8,505,232 B2 * | 8/2013 | Reynolds | A01K 93/00 | |
| | | | 43/44.91 | |
| 8,720,105 B2 * | 5/2014 | Schoenike | A01K 91/16 | |
| | | | 43/44.91 | |
| 8,819,986 B2 * | 9/2014 | Bennis | A01K 91/03 | |
| | | | 43/44.87 | |
| 9,265,240 B2 * | 2/2016 | Kavanaugh | A01K 93/00 | |
| D769,406 S * | 10/2016 | Schoenike | D22/146 | |
| 2002/0095853 A1 | 7/2002 | Teegarden | | |
| 2003/0041502 A1 * | 3/2003 | Mauri | A01K 91/12 | |
| | | | 43/44.98 | |
| 2004/0250463 A1 * | 12/2004 | Haines | A01K 97/06 | |
| | | | 43/54.1 | |
| 2005/0022441 A1 | 2/2005 | Blette et al. | | |
| 2005/0028426 A1 * | 2/2005 | Blette | A01K 91/047 | |
| | | | 43/43.1 | |
| 2005/0034356 A1 * | 2/2005 | Blette | A01K 91/047 | |
| | | | 43/44.9 | |
| 2005/0039376 A1 | 2/2005 | Blette et al. | | |
| 2006/0130389 A1 * | 6/2006 | Annelin | A01K 91/047 | |
| | | | 43/44.98 | |
| 2007/0294934 A1 * | 12/2007 | Myers | A01K 85/02 | |
| | | | 43/44.9 | |
| 2008/0256840 A1 * | 10/2008 | Rodriguez | A01K 93/00 | |
| | | | 43/44.91 | |
| 2008/0295386 A1 * | 12/2008 | Hudson | A01K 95/02 | |
| | | | 43/44.91 | |

(56) References Cited

U.S. PATENT DOCUMENTS

| | | | | |
|---|---|---|---|---|
| 2009/0013585 A1* | 1/2009 | Acworth | ............... | A01K 95/02 43/44.91 |
| 2009/0049735 A1* | 2/2009 | Westover | ............... | A01K 93/00 43/44.87 |
| 2009/0056197 A1* | 3/2009 | Schoenike | ............ | A01K 93/02 43/44.91 |
| 2009/0255165 A1* | 10/2009 | Myers | ................... | A01K 93/00 43/44.91 |
| 2010/0293835 A1* | 11/2010 | Cowin | .................. | A01K 93/02 43/44.91 |
| 2013/0014427 A1* | 1/2013 | Rothan | ................. | A01K 83/00 43/43.1 |

FOREIGN PATENT DOCUMENTS

| | | | | | |
|---|---|---|---|---|---|
| GB | 2298772 | A | * | 9/1996 | ............ A01K 93/00 |
| JP | 08126453 | A | * | 5/1996 | |
| JP | 08228650 | A | * | 9/1996 | |
| JP | 09009836 | A | * | 1/1997 | |
| JP | 10028504 | A | * | 2/1998 | |
| JP | 10178994 | A | * | 7/1998 | |
| JP | 11346617 | A | * | 12/1999 | |
| JP | 2000060386 | A | * | 2/2000 | |
| JP | 2000078942 | A | * | 3/2000 | |
| JP | 2003204743 | A | * | 7/2003 | |
| JP | 2004097217 | A | * | 4/2004 | |
| JP | 2006204216 | A | * | 8/2006 | |
| JP | 2006223282 | A | * | 8/2006 | |
| JP | 2010035443 | A | * | 2/2010 | |
| JP | 2010057452 | A | * | 3/2010 | |
| WO | WO 2010087650 | A2 | * | 8/2010 | ............ A01K 93/00 |

OTHER PUBLICATIONS

Packaging and instructions for Frog Hair® strike indicators, 2004.
Notice of References in U.S. Appl. No. 13/019,296, which is the parent application of U.S. Appl. No. 14/277,025, filed Jun. 26, 2013, 10 pages.

* cited by examiner

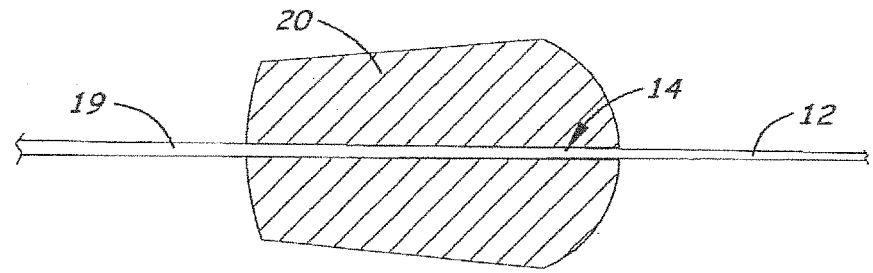
Fig. 4
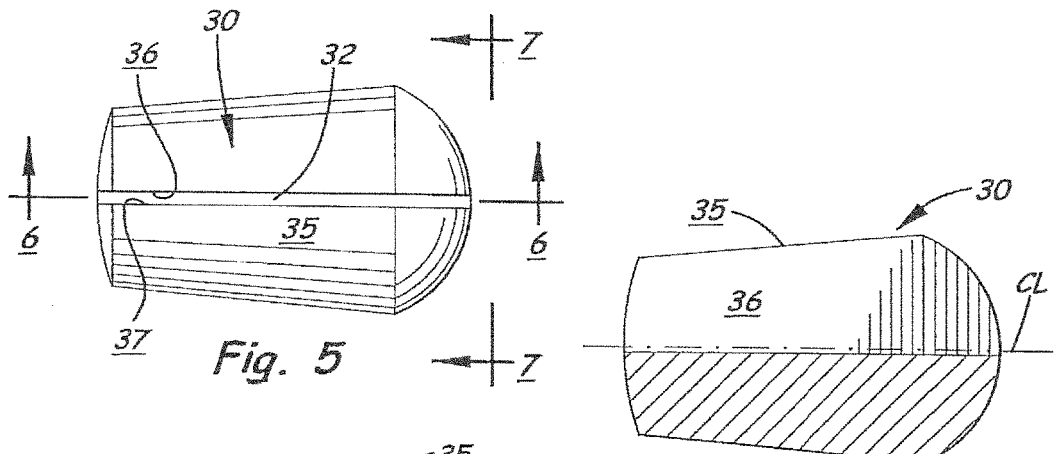
Fig. 5
Fig. 6
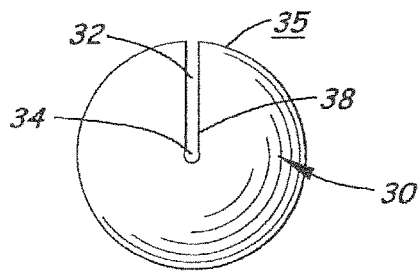
Fig. 7
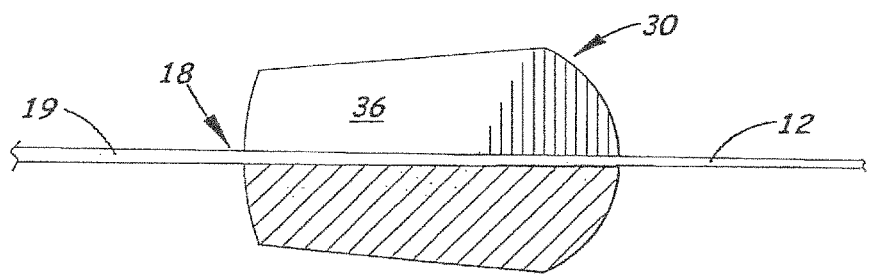
Fig. 8

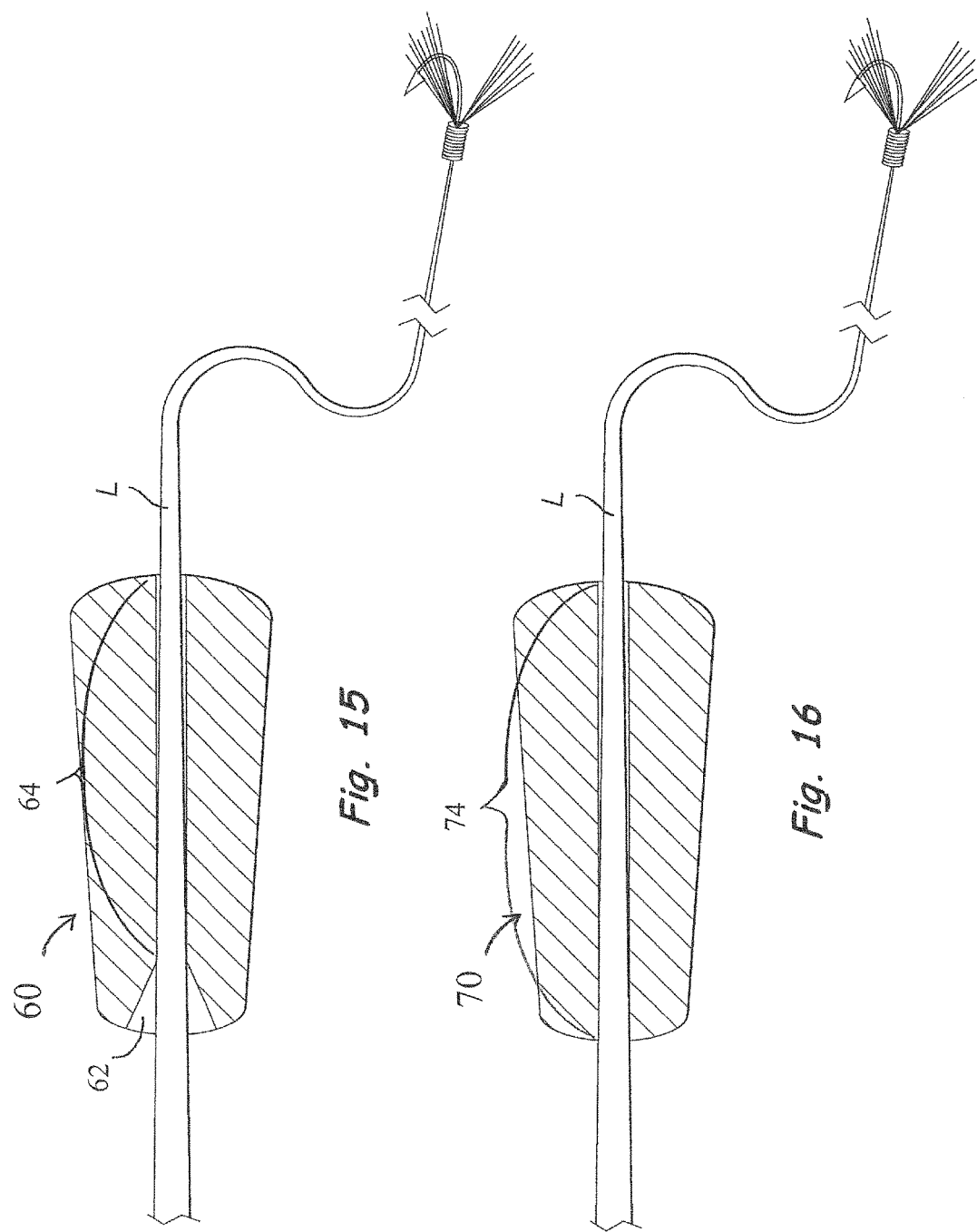

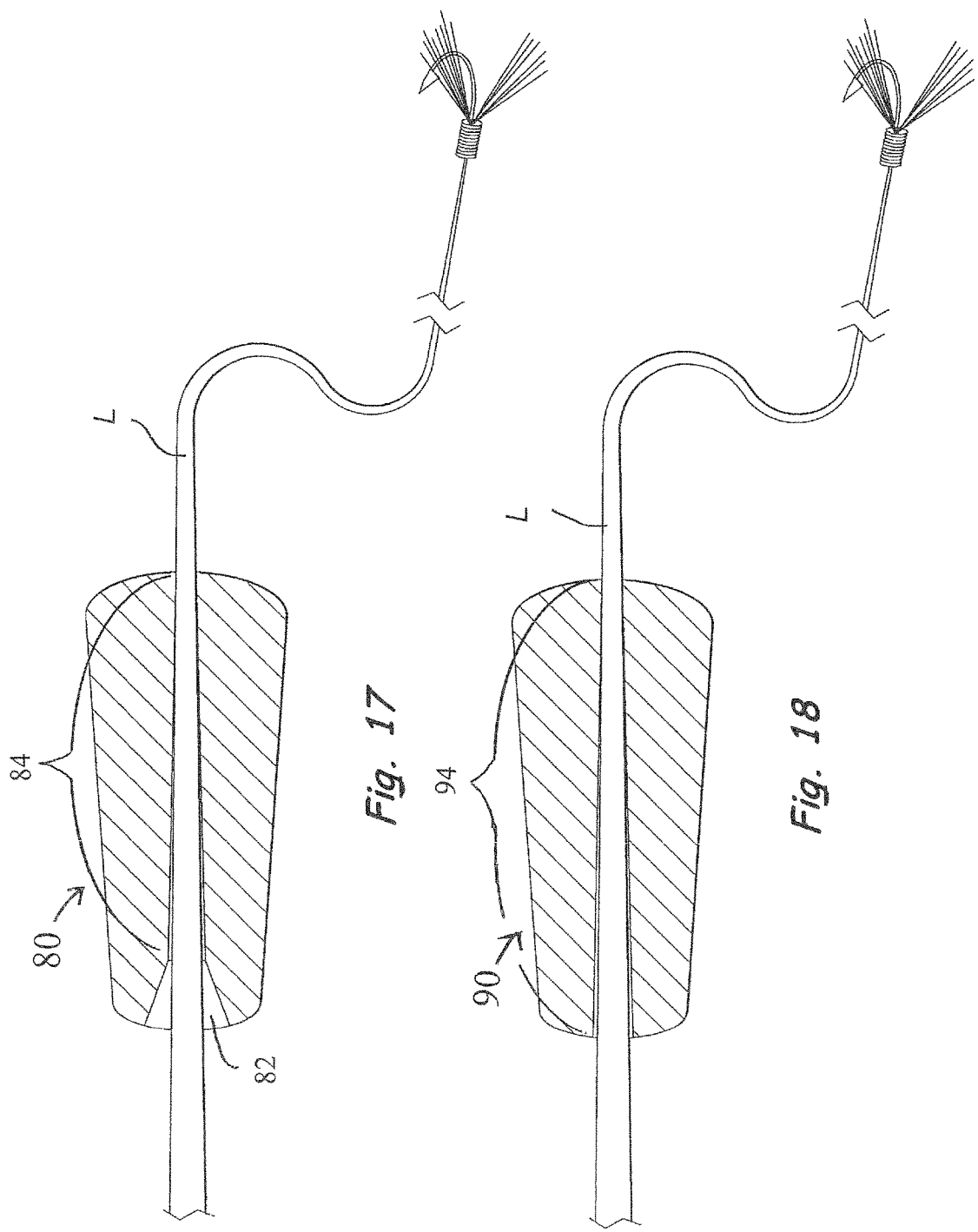

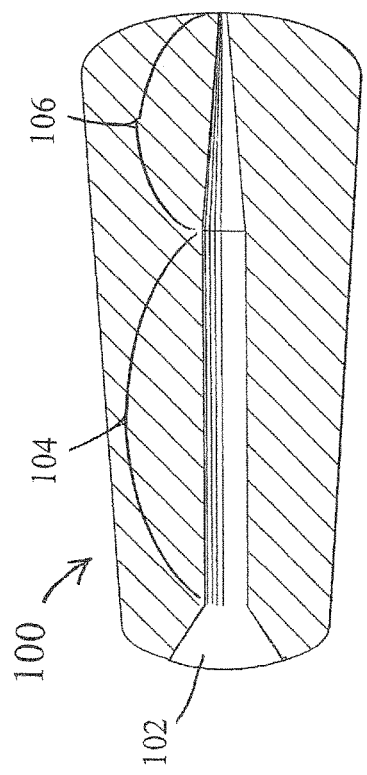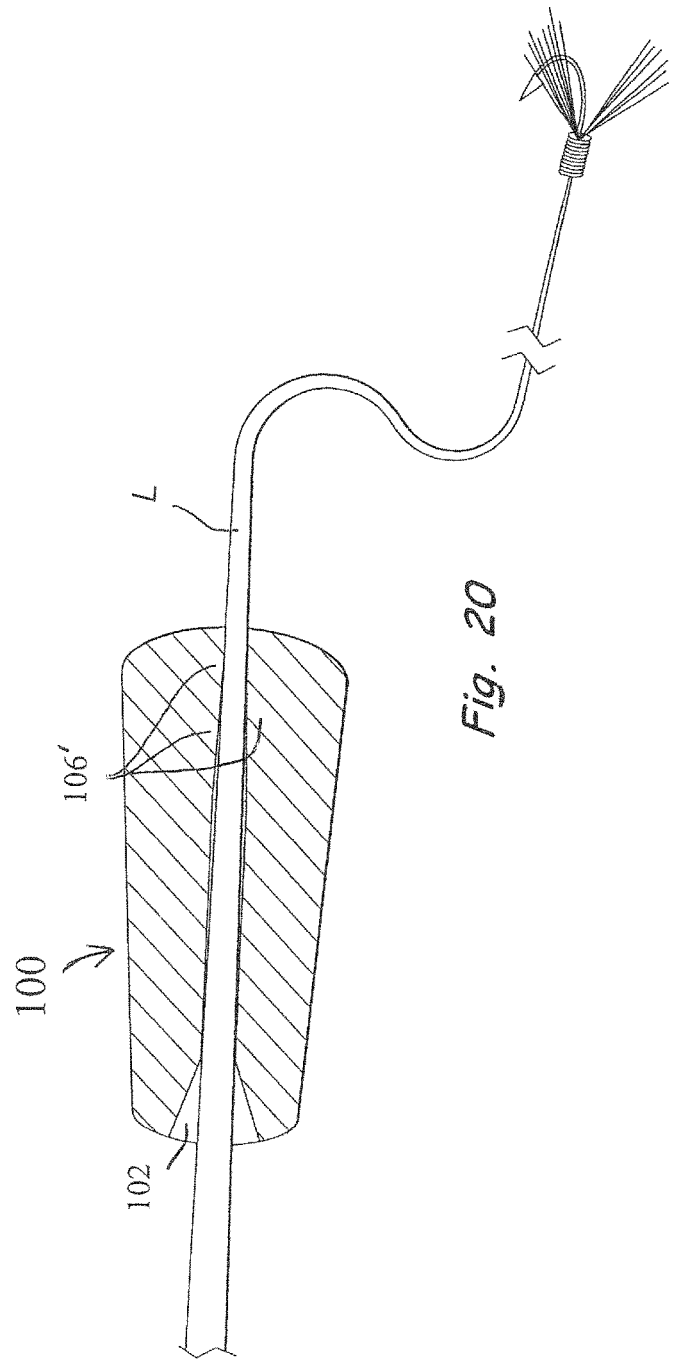

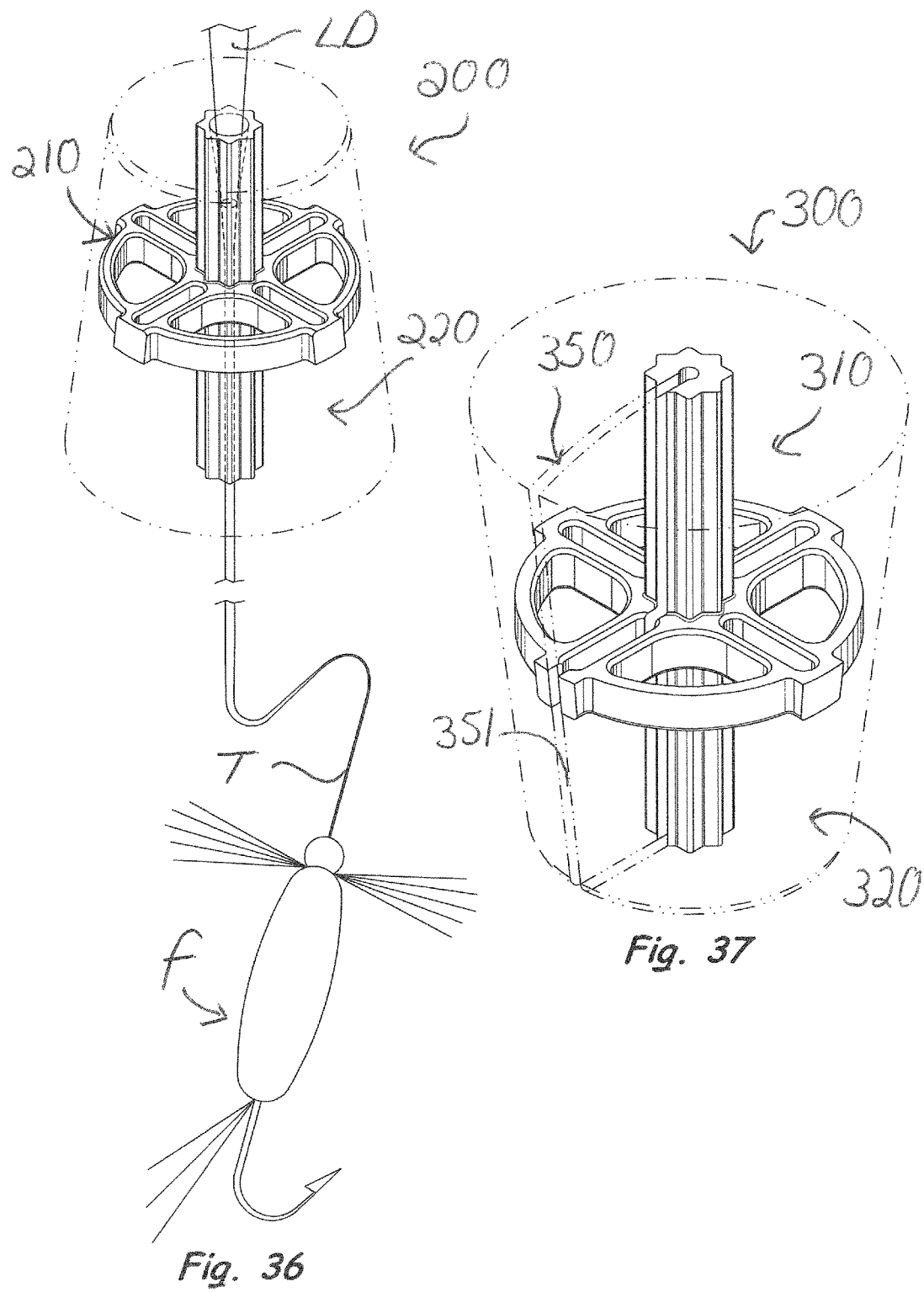

FLY-FISHING FLOAT OR STRIKE INDICATOR AND ATTACHMENT METHODS

BACKGROUND OF THE INVENTION

The disclosures of the following are hereby incorporated by this reference: application Ser. No. 13/019,296, filed Feb. 1, 2011 and issued on May 13, 2014 as U.S. Pat. No. 8,720,105, application Ser. No. 11/838,097, filed on Aug. 13, 2007 and issued on Feb. 1, 2011 as U.S. Pat. No. 7,877,924, and Provisional Application Ser. No. 60/837,376, filed Aug. 11, 2006.

Field of the Invention

The present invention relates to strike indicators and/or floats for fishing, and attachment methods for said indicators or floats. More specifically, the invention relates to indicators or floats that are attached to a fishing line or leader substantially or entirely by a friction-fit or interference-fit between the line/leader and the indicator/float and/or by the line/leader being threaded or slid through a circuitous path in the indicator/float.

Related Art

Fishing floats are common in both lure, live bait, and fly fishing, and many attachment systems are known for attaching the floats to lines and leaders. In lure or live bait fishing, where total weight of the fishing setup is not so critical, many floats are tied, hooked, or clipped onto fishing lines, for example, using spring-loaded hooks or clips. In fly fishing, where total weight is of great importance, the floats, which act as strike indicators, are often "gripped" onto a leader, using a stretchable, rubber gripping member, also called a "rubber band" or "grommet" such as is well-known in the art. Such a grommet extends all the way through a longitudinal bore in the float and protrudes from each end of the float. Such a grommet is typically an elastic tube, or an elongated, elastic strap with enlarged ends. Typically, the grommet is stretched by the fisherman so that the grommet becomes longer and thinner to provide room for the leader to be slid into the bore by means of a side slot that runs end-to-end on the float. Once the resilient grommet is released by the fisherman, the grommet contracts to its normal length and thickness and, in doing so, expands to fill the bore space. The grommet pushes the leader against the bore surface, so that the leader is trapped between the rubbery, gripping surface of the grommet and the bore surface, and, hence, is retained inside the float.

More-recently-developed, alternative fly fishing float attachment systems comprise rubbery and/or resilient grippers at or near each end of the float. These grippers encircle the leader at or near the ends of the floats but do not extend continuously through the float. For example, see FIGS. 1 and 2. FIG. 1 illustrates a float F, with two generally tubular prior art grippers GT on the leader L and inside the float F. These tubular grippers GT are each about ⅕-⅓ as long at the float, and the leader extends through the hollow center of each gripper, with a snug fit of the leader in the gripper. Each gripper GT resides inside the end of the bore of the float, as shown in FIG. 1, forming a snug fit of the gripper with the interior surface of the bore. Thus, the grippers GT connect the leader to each end of the float. The float with pre-installed grippers GT is supplied in the retail package with a thin looped wire (not shown) pre-installed through the grippers and float; the user installs the float and gripper assembly on a leader by inserting the leader through the loop of the wire, and pulling the other end of the wire away from the float to pull the loop with the trapped leader also through the float and grippers. This technique is much like needle-threading devices known in the hand-sewing arts. Such a float and gripper assembly is a "one-use" assembly, which is not removable and reusable on a different leader.

FIG. 2 illustrates a prior art float F and gripper embodiment, generally similar to that in FIG. 1, but wherein the grippers GB are generally oval-shaped and wherein the user may install the float and grippers on the leader before "snugging" the grippers into the ends of the float. The fairly complex installation method recommended for this apparatus results in the two grippers gripping the leader tightly and also gripping the float tightly.

These prior art methods of attaching a float to a fly fishing leader are fairly light-weight options, but still there is a need for an improved attachment system. There is needed an improved float that is particularly well-adapted for convenient and reliable attachment, sufficiently light-weight for fly fishing, and that is easy to use.

SUMMARY OF THE INVENTION

The present invention comprises embodiments of a float, and methods for attaching the floats, which comprise friction-fit or interference-fit of the float directly to the leader/line. In fly fishing applications, the float will often serve as a strike indicator as it floats downstream ahead of, or near, the fly. Upon a fish-strike, the float will be jerked or otherwise moved suddenly, signaling the fisherman that a fish-strike has occurred. In especially-preferred embodiments, the float may include a bore formed/defined substantially or entirely by a surface(s) that is less compressible than the leader that provides said friction-fit or interference-fit between the leader/line and the surface of the bore. An optional slot may be provided from the outer surface of the float to the bore, to aid in installation of the float especially on leaders that comprise a knot.

The preferred floats are specially-adapted to be attached to a tapered fly-fishing leader. A narrow (smaller-diameter) portion of the leader is utilized in the step of first installing the float loosely on the leader. A broad (larger-diameter) portion of the leader is utilized in the step of creating the friction or interference fit by means of the user pushing the float onto the larger-diameter portion of the leader to the point wherein the leader is tightly wedged in the float. The leader/line may be inserted longitudinally into the float, or slid sideways into embodiments with a side-slot. Preferably, there are no separate connection members, for example, no rubbery grommets or grommets of any kind; no tubes, ovals, or balls; and no hooks, clamps, or other fasteners that connect the float to the leader/line, other than the fastening function of friction or interference between the leader the and float. Preferably, there is no tying of the line/leader to the float.

In certain embodiments, proper attachment of the float to the leader, by creating a tight friction/interference fit between the float and the leader, is especially enhanced by providing a bore surface that is less compressible than the leader. Therefore, in certain embodiments, an incompressible or substantially incompressible bore surface, which in any event is preferably less compressible than the leader, is provided inside the float, to capture and retain the relatively-more-compressible leader. In certain embodiments, the interior surface that defines/surrounds the entire bore is incompressible, substantially incompressible, or at least less compressible than the leader (hereafter, referred to generally by the term "non-compressible"). Preferably, in embodiments that comprise a slot from the bore to the outer surface of the float, the slot also will be lined or otherwise defined by a material that is the same or similar to the bore surface, that is, incompressible, substantially incompressible, or at least less compressible than the leader (hereafter, referred to generally as "non-compressible"). The non-compressible surfaces for the bore, and preferably for the slot when present, may be surfaces of a member, called an "insert", around which the main body of the float is formed.

The main body of the float is preferably light-weight material(s) that is/are less dense than water, so that it casts smoothly and floats on water. The main body may be, for example, closed-cell polymer foam such as closed-cell polystyrene foam, formed around the insert in a desirable shape and size. Therefore, especially-preferred embodiments in each set of embodiments comprise a compressible, polystyrene foam body, inside of which is an insert with non-compressible surfaces for reliably establishing the very tight friction or interference fit. The non-compressible surfaces may be smooth and rigid, for example, not rubbery and not tacky, so that the tight interference fit, even to the point of compressing the leader in the bore, affects the connection of the float to the leader, rather than any rubbery or elastic gripping by the bore surface.

The non-compressible surface that defines the bore allows the float to be pushed toward the larger-diameter portion of a tapered leader, to a point wherein the leader is very tightly received in the bore. The bore surface is specially-adapted, by virtue of its non-compressibility, to firmly engage the leader without compressing or changing the bore surface shape or diameter, even when the float is pushed with substantial force onto said larger-diameter portion of the leader. The leader is more compressible than the insert, so that the force of "wedging" or "shoving" the leader into the non-compressible bore in a very tight fit results in at least a portion of the leader being compressed inside the bore. Thus, this compression of the leader, and the resulting tight interference fit, prevents the float from loosening or sliding relative to the leader, after installation, during casting, and during fishing, even though there are no grommets or other fasteners used. The inventor has found that the combination of the non-compressible insert surrounded by a very low-density material results in a float with superior performance, in terms of simple and extremely reliable installation on a fly-fishing leader, and excellent casting and strike-indication performance. The inventor has found that the non-compressible bore is less likely to become loosened on the leader than a compressible bore, for example, a bore formed and defined by a closed-cell polymeric foam surface.

In a first set of embodiments, the float is attached to a fly fishing leader by the leader being inserted longitudinally through the float bore, and pushed toward the larger-diameter leader end, until the very tight friction and/or interference fit is achieved. The float typically will not slide along the leader unless purposely slid relative to the leader by the fisherman or other person. In a second set of embodiments, the float is inserted through a side-slot in the float, to reach the longitudinal bore, after which float is pushed toward the larger-diameter portion of the leader, to create said very tight friction or interference fit.

It may be noted that, whether the leader enters the float at an end or through a side-slot, once the leader is in the bore, subsequent installation actions and results are substantially or entirely the same. The side-slot embodiments are particularly beneficial for applications wherein the fly is already attached to the tip end, or wherein there is a knot or other enlarged area on/in the leader, so that the float may be installed "above" the knot/enlargement (nearer the larger-diameter end) rather than "threading" the tip/tippet end of the leader through an end of the bore.

Once installed, by insertion either axially or sideways through a side-slot and then by pushing to the tight fit, the float is secured so firmly and tightly on the leader that it is not moveable, and does not move, relative to the leader during use. Preferably, the float is only moveable if the user purposely grasps and forces the float toward the smaller-diameter, tip end of the leader to dislodge the float from the tight fit. Preferably, no threading tools, and no other tools or attachments, are needed to install and use the floats of the invention.

BRIEF DESCRIPTION OF THE DRAWINGS

FIG. 4 is a side cross-sectional view of an alternative embodiment of a float with a longitudinal bore. The float is attached to the leader by the method illustrated in FIG. 3, that is, with a friction fit between a thick portion of the leader and at least a portion of the longitudinal bore of the float. The float is shown in cross-section, but the leader is not.

FIG. 5 is a side view of an alternative embodiment of float having a side slot that extends to generally the centerline of the float to form and/or to connect to a longitudinal axis bore of the float.

FIG. 6 is a cross-sectional view of the float of FIG. 5, viewed along the line 6-6 in FIG. 5.

FIG. 7 is an end view of the float of FIGS. 5 and 6, viewed along the line 7-7 in FIG. 5.

FIG. 8 is a cross-sectional view of the float of FIGS. 5-7, with the float attached to the leader by friction fit between a thick portion of the leader and at least a portion of the longitudinal bore of the float, after the leader has been inserted into the float by means of the side slot.

FIGS. 15 and 16 are cross-sectional side views of another embodiment of float according to the invention, wherein the float of FIG. 15 has a constant diameter throughout the bore except for an enlarged end opening at one end of the float. The float of FIG. 16 is the same as the float in FIG. 15 except without said enlarged end opening.

FIGS. 17 and 18 are cross-sectional side views of another embodiment of float according to the invention, wherein the float of FIG. 17 has a slightly-tapered diameter throughout the bore plus an enlarged end opening at one end of the float. The float of FIG. 18 is the same as the float in FIG. 17 except without said enlarged end opening. The leaders in FIGS. 17 and 18 are not shown in cross-section.

FIGS. 19 and 20 are cross-sectional side views of another embodiment of float according to the invention, wherein the bore of the float comprises a constant or nearly constant bore in the middle region of the float, a significantly-tapered/restricted end at one end of the float, and an opposite enlarged end. FIG. 19 portrays the float before attachment to the leader, and FIG. 20 portrays the float having been installed on a tapered leader, wherein the leader in FIG. 20 is not shown in cross-section.

FIG. 23 has a tapered bore, with the diameter smoothly decreasing from one end to the other, without any "corners" or abrupt changes in diameter. FIG. 24 has a smoothly tapered bore, with a flared bore end at the small end of the float, which makes line/leader insertion easier. FIG. 25 has a bore with a straight main region (non-tapered) and tapered ends; the bore tapers to a larger diameter at the small end of the float, and the bore tapers to a small diameter at the large end of the float.

FIG. 36 is a perspective side view of a second step of installing the float of FIG. 35 on the leader, by pushing the float toward the larger-diameter end of the leader until a tight interference fit is formed between the insert and the leader.

FIG. 37 is a perspective side view of an alternative embodiment of a float with insert, wherein the float comprises a side-slot from the outer surface to the bore, and the main body of the float is shown in dashed lines.

FIG. 44 is a perspective side view of an alternative insert.

FIG. 45 is a perspective side view of yet another insert encased in a double-truncated cone main body that is shown in dashed-lines.

FIG. 46 is an axial cross-sectional view of the float in FIG. 45.

FIG. 47 is a perspective side view of an alternative float, similar to that shown in FIGS. 45 and 46 except that it comprises a side-slot.

FIG. 48 is a perspective side view of yet another float with an insert.

FIG. 49 is an axial cross-sectional view of the float of FIG. 48.

FIG. 50 is a perspective view of an alternative float, similar to that shown in FIGS. 48 and 49 except that it comprises a side-slot.

FIG. 51 is a perspective side view of yet another float with an insert.

FIG. 52 is an axial cross-sectional view of the float of FIG. 51.

FIG. 53 is a perspective side view of an alternative float, similar to that shown in FIGS. 51 and 52 except that it comprises a side-slot.

FIG. 54 is a perspective side view of yet another float, with an insert adapted to fit inside a spherical main body, wherein the transverse flange is generally a cylindrical shape.

FIG. 55 is an axial cross-sectional view of the float of FIG. 54.

FIG. 56 is a perspective side view of an alternative float, similar to that shown in FIGS. 54 and 55 except that it comprises a side-slot.

FIG. 57 is a perspective side view of yet another float, with an insert inside a spherical main body, wherein the transverse flange is a small sphere shape.

FIG. 58 is an axial cross-sectional view of the float of FIG. 57.

FIG. 59 is a perspective side view of an alternative float, similar to that shown in FIGS. 57 and 58 except that it comprises a side-slot.

DETAILED DESCRIPTION

Referring to the Figures, there are shown several, but not the only, embodiments of the invented float and method for attaching floats to fishing lines or leaders. For convenience, the term "float" is used throughout this description, but, especially for fly fishing applications, "indicator" or "strike indicator" would serve as well, because the main purpose of the device in fly fishing is to float at or near the water surface after the fly has been laid-out and to indicate by its movement that a fish strike has occurred.

A bore is provided through the float and the float is attached by means of the float fitting tightly on the leader by a tight fit between at least part of the float bore surface and at least a part of the line/leader. In the case of a fly fishing leader, embodiments of the invention utilize the shape of the leader, which is smoothly tapered from a small diameter end to a large diameter end, to form a tight fit between the leader and the surface of the bore along at least part of the length of the bore. A conventional leader, and even the tippet of a conventional leader (or "tip" or "tip end," the thin distal end of the leader), is stiff enough to be pushed through the bore of the preferred embodiments, so that no tools are needed.

Attachment of the float to the leader is preferably done without hooks, clamps, grommets, gripper tubes, other grippers, or tying. Although the floats of the preferred embodiments may be said to "grip" the line or leader, or vice versa, it is understood that this is accomplished by interference between the bore surface (unaided by added fastening members) and the leader. In other words, such an attachment preferably consists only of a tight fit between the leader and the surface of the bore, and most preferably a tight fit that compresses the leader slightly.

Figure 3:
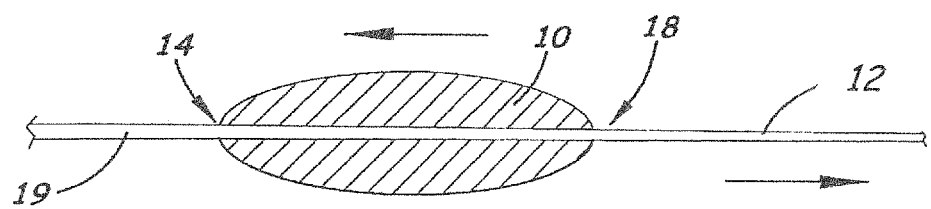
FIG. 3 illustrates a side cross-sectional view of one embodiment of the invention, wherein the float is being attached to the leader by engagement of the float directly with the leader, rather than by use of separate gripping, hook, or clamp members. A leader is inserted into the longitudinal bore of a float and the leader is pulled relative to the float to move a thicker portion of the leader into engagement with the longitudinal bore of the float. The float is shown in cross-section, but the leader is not.

FIGS. 3 and 4 schematically illustrate floats 10, 20 wherein the narrow (small diameter) end 12 of the leader has been inserted axially through the bore 14 of the float, by simply inserting it (by virtue of its own slight rigidity) into and through the bore 14. Less preferably, a threading tool of some sort may be used to assist in "threading" the leader axially through the bore, but preferably such a threading tool is not needed and not desired.

Once the leader 18 is all the way through the bore and its narrow end 12 may be accessed (to the right in FIG. 3), the narrow end 12 is pulled to the extent that the leader 18 slides through the bore until it is trapped or "stuck" in the bore (by virtue of the larger diameter of the thick leader portion 19 to the left in FIG. 3). The central bore of the bore may be made with a single diameter, or may be tapered along part of all of its length to better fit a tapered leader, for example. It may be that all or substantially all of the leader inside the bore may be in firm and tight contact with the bore surface, or it may be that only a portion of the leader in the bore (for example, the left half of the leader portion that is in the bore in FIG. 3) is tight in the bore. It is desired that the leader be pulled hard enough to "wedge" the leader in the bore along the majority of the bore length, and, more preferably, along at least ¾ of the bore length.

Alternative floats and methods include providing a "slit" or "slot" into the float to provide for "side-ways" of "radial" insertion of the line or leader into the float. In the embodiment of FIG. 5-8, float 30 generally of the same shape as the float in FIG. 4 is provided, with the addition of a side slot 32 all the way along the length of the float and extending all along the float 30 as far as the longitudinal axis bore 34. This way, the float is "slit" from one side surface 35 as far as the centerline (CL, shown in dashed lines in FIG. 6), wherein the centerline lies on the plane of the slit/slot. This is best illustrated in FIGS. 5 and 6. In FIG. 5, the side view, facing the slot 32 allows the viewer to, in effect, look into the slot 32. In the cross-sectional view of FIG. 6, the float 30 has been sliced along the central plane of the slot, so that the upper half of FIG. 6 reveals one of the slot walls 36, and the lower half of FIG. 6 shows the sliced body of the float.

Figure 1:
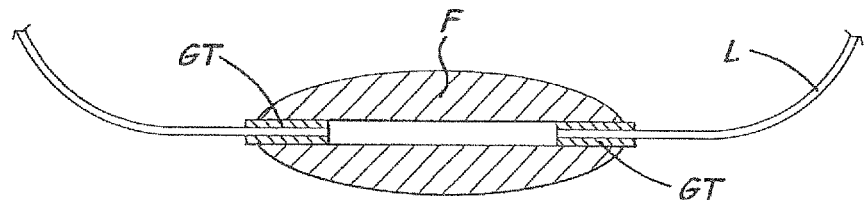
FIG. 1 illustrates a prior art method of float attachment, wherein two generally tubular rubbery grippers are fixed in the ends of the float.
Figure 2:
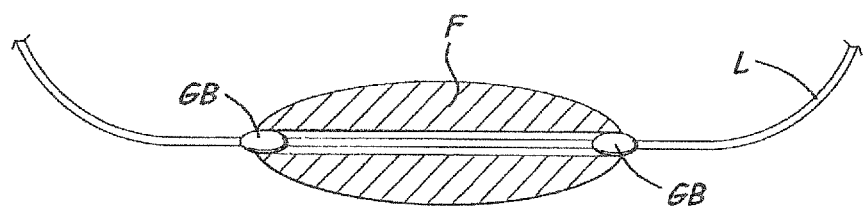
FIG. 2 illustrates another prior art method of float attachment, wherein two generally oval-shaped grippers are pushed into the ends of the float.

To attach the float 30 onto the leader 18, the leader 18 is slid "sideways" through the slot 32 to the "bottom" of the slot, which bottom is preferably the longitudinal bore 34 at the central axis of the float. This method of insertion of the leader may be easier than "threading" the leader axially through the bore as discussed above regarding FIG. 3. This float style and method of insertion may be especially desirable because it allows the float 30 to be installed even on a leader that has had tippet material tied onto it after the original tippet has broken or been cut. This type of embodiment, that is, with a sideways slot, can be installed on the leader above a tippet knot as it does not have to be slid axially all the way from the tippet end to the thicker end. Such embodiments may be slid sideways onto the leader above the tippet knot, but still on a portion of the leader that is smaller in diameter than the bore of the float, and then slid further up the leader to tighten the float on a larger-diameter ("thicker") portion by friction/interference. This is a distinct advantage compared to the prior art floats in FIGS. 1 and 2, which are installed only axially on the leader and are held by grippers, and which cannot be installed on the leader above a tippet knot because the knot will not fit through the grippers.

Most fisherman, when installing a side-slot embodiment on a leader, will choose to slide the narrow portion 12 into the bore 34 via the slot 32 and then slide the float 30 along the leader 18 toward the thicker end to be tight on the thicker portion 19 of the leader after the leader is in the bore 34. Therefore, the slot 32 preferably is sized to provide a close, but not tight, fit between the narrower portion 12 of the leader and the slot walls (36, 37) all the way through the slot. Alternatively, the fit between the narrower portion 12 and the slot walls (36, 37) may be fairly loose until the region of the slot walls very near the bore; in such a case of loose fit between leader 18 and slot 32, the leader 18 would be snapped past a restriction (if any, not shown) that may be at the region 38 near the bore or part of the bore, in order to "snap into" the bore 34. Preferably, the bore is loose enough to receive the narrower portion 12 of the leader fairly easily, but then to tighten on the leader as the float is slid axially to the thicker portion. This way, it will be fairly easy and comfortable for the fisherman to slide the float sideways onto the thinner portion of the leader (even past a close or snug fit between the side-slot and the leader) and then, after the float is on the leader, to apply axial force (sliding the float axially relative to the leader) that is sufficient to "lock" the float onto the thicker portion of the leader. Thus, the fine motor skills of sliding the float sideways are applied before the relatively more gross motor skills and greater force are used to "lock" the float on the leader. Still, this method of frictional/interference attachment allows for removal of the float from the leader and reuse of the float on another leader and/or at another time.

The slot in certain embodiments of the float may be various sizes and shapes, and may include non-straight slots.

Preferably, the slot extends all the way to the central axis all the way along the slot length, as this provides for the leader to be generally centered in the float. Typically, the float body will be symmetrical around the central axis, and the leader will be longitudinally centered in the float, resulting in a more predictable fly cast and lay-out of the fly.

Alternative floats include a non-straight slot for insertion of the leader/line, which slot preferably terminates at the central axis of the float to create the bore. As discussed above, the slot and bore need not be two separate features or made by two separate steps, and the bore may simply be described as the bottom of the slot. In FIGS. 9-13, a float 40 has what may be called a "Z-shaped slot" or a "Z-side-slot" 42, wherein each end of the float has a slot that extends to the bore 45 at the central axis but wherein the slots at the two ends either: 1) either extend in opposite directions from the bore (wherein, they may be on the same plane but extending away from each other, in other words at 180 degrees from each other), or 2) are on different planes. Because the slots at the ends of the float connect and communicate with each other, they may be called "slot portions."

In the embodiment of FIGS. 9-13, the end slot portions 43, 44 are 180 degrees from each other, so they may be said to extend in opposite directions from the bore 45 on the same plane. A transverse slot portion 46 extends from the outside surface of the float 40, at an angle to the length of the float, and connects to, and communicates with, both the "right and left" end slot portions 43, 44 and may be said to form a small part of the bore 45 at the intersection of the right and left end slots 43, 44. The bottoms of each of the end slot portions 43, 44 form the left and right portions of the bore (using the orientation of FIGS. 9 and 12), and the end slot portions 43, 44 join generally in the middle of the float when they communicate with the transverse slot (see 47 in FIGS. 9 and 12).

Figure 9:
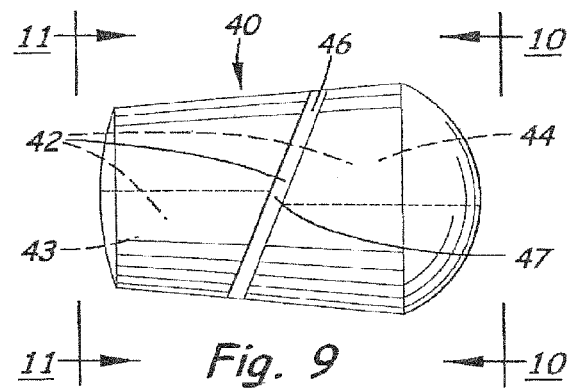
FIG. 9 is an alternative embodiment of the float having a "Z-side-slot," which is one embodiment of a circuitous path for insertion of the leader, wherein the two end slot portions are 180 degrees away from each other.
Figure 10:
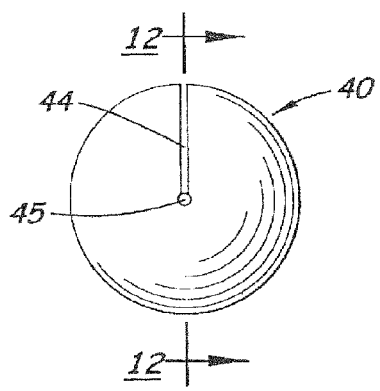
FIG. 10 is an end view of the float of FIG. 9, viewed along the line 10-10 in FIG. 9.
Figure 11:
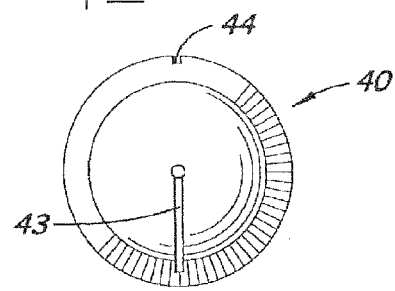
FIG. 11 is an end view of the float of FIG. 9, viewed along the line 11-11 in FIG. 9.
Figure 12:
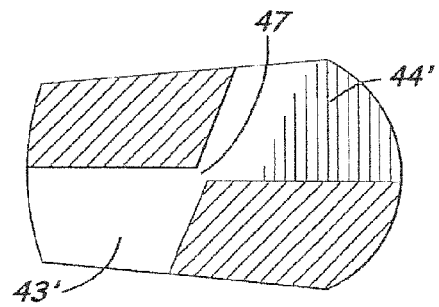
FIG. 12 is a cross-sectional view of the float in FIGS. 9-11, viewed along the line 12-12 in FIG. 10.
Figure 13:
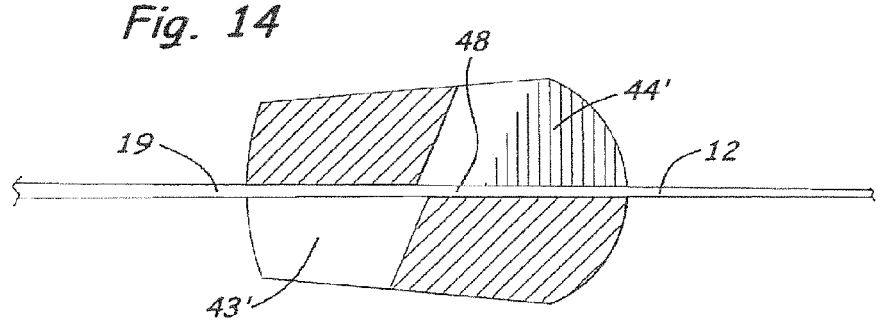
FIG. 13 is a cross-sectional view of the float in FIGS. 9-12, shown with the leader (not in cross-section) installed in the float.

Best visualized by referring to FIGS. 9, 12, and 13, the method of installing the float 40 on the leader/line may be described as follows: insert a right portion (12) of the leader into the right end slot 44 (by laying it down in the right slot that opens upward in the figures, wherein a wall 44' of slot 44 is visible in FIGS. 12 and 13); insert a left portion (19) of the leader into the left slot 43 (by pulling it upwards into the left slot that opens downward in the figures, wherein a wall 43' of slot 43 is visible in FIGS. 12 and 13); and laying the central portion (48) of the leader transverse to the length of the float in the transverse slot portion 46; and then pulling both ends of the leader, while guiding the leader into the Z-shaped slot 42, so that the portions of the leader slide through their respective slot portions to the central bore. In other words, the leader is inserted generally sideways into the Z-shaped slot, but the portions (12, 19, 48) of the leader approach the central bore 45 from different directions, or, in other words, through a circuitous slot or path to the bore. Once portions 12, 19, 28 are inside the float, the user will typically pull on opposite ends of the leader (12, 19) to put tension on the leader. This tension which will tend to straighten out the leader inside the float, resulting in the leader sliding all the way to the central bore 45 to extend straight through the float central bore 45, as shown in FIG. 13. In this position, the leader is received in the bottoms of the right and left end slots 43, 44 and in a very small central portion of the transverse slot (47), which bottoms and very small central portion join and align as the central bore 45 (see FIGS. 12 and 13).

After passing through the circuitous slot/path and straightening out, the leader is unlikely to come out of the float 40, as tension on it will tend to keep it straight in the bore 45.

Also, typically, once the leader is installed inside the bore 45, the fisherman typically will slide the float 40 relative to the leader to a point wherein the thicker portion of the leader is "stuck" or "wedged" in the bore. This way, both the tight fit of the leader in at least a portion of the bore and the circuitous exit path (out through the Z-slot 42) tend to keep the float 40 in the desired location on the leader. Further, the right and/or left end slots 43, 44 and/or a part of them, may be adapted to be a snug or tight fit with the leader, if desired, as this will further decrease the chance that the float will come off the leader. In some embodiments, the fisherman may again pull the leader out of the float through the Z-shaped slot, if he/she wishes, but it will take some manipulation on his/her part and this will not tend to happen accidentally. As with a single bore and/or a simple side-slot according to embodiments of the invention, the method of frictional/interference attachment using a circuitous slot system also provides the benefit of being able to remove the float from the leader and reuse the float on another leader and/or at another time.

In a way similar to the discussion regarding the tightness of the slot 32 in the embodiment of FIGS. 5-8, the slot portions 43, 44 and 47 may be of various widths relative to the leader. The inventor prefers that at least one, and preferably two or all, of the slots 43, 44, 47 be sized to fit fairly snugly with the leader (a "close fit" or "a snug fit") as the leader is being slid sideways into the float, so that, in the reverse, it will not be easy for the leader to slide out of said slots. However, in less-preferred embodiments, not all of the slots/slot portions need to fit snugly with the leader as the leader slides through. For example, in less-preferred embodiments, if the two end slots 43, 44 are sized to fit snugly with the leader, then the transverse slot portion 47 may be relatively loose to help ease the insertion of a thicker portion of leader. Embodiments of the invention may comprise a frictional attachment of the float onto the leader merely by being slid sideways through slots such as these, wherein the bore fits tightly on the leader as soon as the leader is slid sideways into the bore, but it is preferred that the frictional attachment to "lock" the float onto the leader actually takes place, after the sideways installation of the float on the leader, when the float is slid axially farther up the leader to a thicker portion of the leader. Thus, in preferred circuitous-slot embodiments, once the leader is inserted into the float through the circuitous slot, the float is slid along the leader to create an interference fit between the bore and the leader and it is this interference float that serves as the sole connection between the float and the leader. If the float were to become loosened from the interference fit, the leader would still be "trapped" inside the float whereby the only exit for the leader from the float is a circuitous, and, hence, difficult path.

Figure 14:
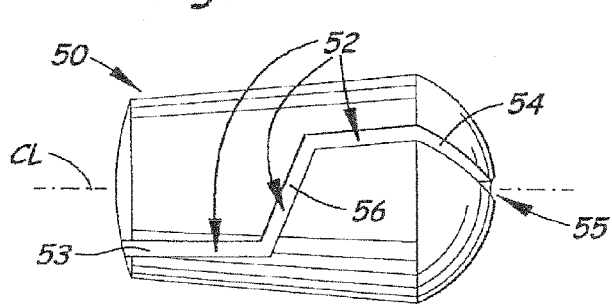
FIG. 14 is a side view of an alternative embodiment of a float with a "Z-side-slot," wherein the two end slot portions are less than 180 degrees apart.

FIG. 14 illustrates another embodiment of a float 50 that has a Z-shaped slot 52, but wherein the "right and left" end slot portions are not 180 degrees apart. Because the end slots 53, 54 are less than 180 degrees apart, both end slots 53, 54 are visible in FIG. 14. The right and left end slots 53, 54, in this embodiment, are approximately 90 degrees apart. Again the right and left end slots "bottom-out" at the central axis (CL), forming the majority of the central bore 55, and the transverse slot portion 56 connects the end slots 53, 54 at generally the center of the float. As in the above-detailed method, the leader may be inserted into all three portions of the slot at the roughly the same time (the end slots 53, 54 and the transverse slot portion 56), and with moderate pulling of the leader ends, the leader will tend to snap or slid toward the center axis of the float 50 to straighten out in the bore 55 at the central axis CL.

Many other configurations and angles may be used for embodiments of the non-straight slot systems. For example, angles other than 180 or 90 degrees may be used. For example, end slots may be very close to each other (as little as 1 degree apart, but this is less preferred due to the difficulty of straightening the leader in the float) or very far apart (as much as 180 degrees apart). More preferably, to facilitate the insertion and straightening of the leader in the float, the end slots are between 90 and 180 degrees from each other, and most preferably about 135 degrees from each other.

Even more circuitous slots may be used, such as slots with more slot portions by virtue of more "twists and turns," and/or non-straight/non-planar slot portions. For example, instead of a Z-slot with a planar right end slot, a planar left end slot, and a planar transverse slot, any one or more of the slot portions may be curved. For example, the end slot portions may be planar and the transverse (connecting) slot portion may be curved. Or, each end slot may be curved and the transverse slot may be planar. Or, one of the other of the end slot portions may be curved and the other portions may be curved. By curved, it is meant that the walls that form the slot portion are not planar, which would also result in the opening to the slot not being straight but instead having a curved appearance. Preferably, still, all the various slot portions communicate with each other to form a straight or substantially straight bore through the float.

FIGS. 15-31 illustrate embodiments of the invented float/strike indicator that are attached by axial insertion of the tippet end of the leader into and through the bore of the float, followed by the user pulling the leader to wedge a thicker portion of the leader in the float, as described above for other embodiments. The preferred embodiments in FIGS. 15-31 feature elongated float main bodies with rounded ends, which are substantially solid and which preferably have only a single bore through the length of the bore at or very near to the central axis of the float. The "single bore" need not have only a single diameter, however, as it may be tapered, have multiple diameters, and/or have enlarged end openings and/or the tapered ends. Preferably, there are no side-ways slots/slits in the floats of FIGS. 15-31. The floats illustrated in FIGS. 15-31 have smaller ends facing away from the fly, for improved aerodynamics during the forward step of the fly-fishing cast wherein the smaller end of the float will be moving forward in the air, away from the fisherman. Alternative main body shapes, however, could be used.

FIGS. 15 and 16 illustrate float embodiments 60, 70 that feature elongated bores having a constant diameter along all, or along a significant portion, of the bore. FIG. 15 has a funnel-shaped opening 62 at one end of the float, which funnel-shaped opening 62 is the end into which the tippet of the leader is inserted when the float is to be installed on the leader. The preferred funnel-shaped opening 62 is generally conical in shape, but other enlarged end openings into the bore may be effective. A funnel-end or other enlarged end has a maximum diameter preferably 2-5 times the diameter of the main portion 64 of the bore (the "main diameter"), which enlarged opening gives the user a larger target when trying to thread the leader into the bore. The funnel-end or other enlarged end opening preferably extends only about ⅙-¼ of the way along the length of the bore and the float, and the remainder of the bore, the bore main portion 64, is a straight, constant-diameter cylindrical bore.

As illustrated in FIG. 15, a tapered leader gently inserted into the constant-diameter portion of the bore will not exhibit a tight fit between the outer surface of the leader and the bore surface all along the length of the bore. However, upon pulling the leader farther through the float (leader being pulled to the right in FIG. 15), the leader will become even more tightly wedged in the float causing the float material to compress slightly to conform to the size and shape of the leader, thus providing a tight, gripping fit between the leader and the bore all along the length of the bore.

In FIG. 16, the float 70 has the same constant-diameter bore of the float of FIG. 16, but without the funnel-end or other enlarged end opening. As in the embodiment of FIG. 15, a tapered leader gently inserted into the constant-diameter bore 74 of FIG. 16 will not exhibit a tight fit between the outer surface of the leader and the bore surface all along the length of the bore. However, upon pulling the leader through the float farther to the right in FIG. 16, the float material will compress slightly as the leader is wedged in the float, providing a tight, gripping fit between the leader and the bore all along the length of the bore.

FIGS. 17 and 18 illustrate embodiments 80, 90 that feature bores having a tapered diameter along all, or along a significant portion, of the bore. FIG. 17 has a funnel-shaped opening 82 at one end of the float, as in FIG. 15. The funnel-shaped opening or other enlarged end opening preferably extends only about ⅙-¼ of the way along the length of the bore and the float, and the remainder of the bore is a straight bore tapering smoothly from a larger diameter at the left to a narrow diameter at the right.

Depending on the taper of the bore main portion 84 in the embodiment 80 of FIG. 17, a tapered leader gently inserted into the bore may or may not exhibit a tight fit between the outer surface of the leader and the bore surface all along the length of the bore. In the event that the taper of the bore does not match the taper of the leader, there will be some regions of the bore that do not contact/mate with the leader, until the leader is pulled farther to the right in FIG. 17, and the float material compresses slightly to conform to the size and taper of the leader to provide a tight, gripping fit between the leader and the bore all along the length of the bore.

In FIG. 18, there is shown the float of FIG. 17 but without the funnel-end. As with the float of FIG. 17, if the taper of the bore matches the taper of the leader, a tight fit between the bore 94 and the leader all along the length of the float is easily achievable. However, in the event that the taper of the bore does not match the taper of the leader, there will be some regions of the bore that do not contact/mate with the leader, until the leader is pulled farther through the float to achieve the desired compression of the float material and resulting tight, gripping fit all along the length of the bore.

FIGS. 19-22 illustrate embodiments 100, 110 that comprise a constant or substantially constant-diameter bore main portion and a significantly-tapered portion at the end of the float that is near the fly (the "fly-end" of the float). By "significantly-tapered," it is meant that the bore goes from its full diameter (the diameter of the bore main portion) to a fraction of that diameter (or nearly closed) within about ⅙-⅓ of the length of the bore, and, more preferably, about within about ¼ of the length of the bore. The "full diameter" or "main diameter" is preferably sized, as described below, to be between the diameters of the thickest ends and the thinnest ends of conventional leaders (preferably 0.014-0.020 inches), and the significantly-tapered portion is preferably sized to taper to a diameter about 20-70 percent, or more preferably about 30-60 percent of the bore main diameter. To accommodate 3x through 6x leaders (see table below, 3x, 4x, 5x, and 6x) for example, the significantly-tapered portion would taper down to about a 0.009 inch diameter so that the leader tippet can be inserted through said significantly-tapered portion for access prior to the user pulling said tippet end of the leader. To accommodate 6x and 7x leaders, the significantly-tapered portion could taper down to about a 0.006 inch diameter. Thus, in these examples, the wall of the bore in that significantly-tapered region could be slanted from 0.014-0.020 (inward and toward the end of the float) to a 0.009 inch diameter, and a 0.006 inch diameter, respectively. Optionally, these floats also have a funnel-shaped end or other enlarged end opening at the opposite end of the float, that is, the end of the float that is normally away from the fly.

FIG. 19 illustrates one float 100 having an embodiment of said "significantly-tapered" portion 106 (hereafter "tapered portion") at the fly-end of the float. This embodiment also has a funnel-end 102 that allows easier threading of the tippet end of the leader into and through the float. Note that, in FIG. 20, a leader has been inserted through the float, and, in response to the force of the user pulling the leader through the float, the float material in the area of the tapered portion has compressed and/otherwise given way to the leader to an extent that the leader fits through said tapered portion and the leader is gripped firmly by the compressed tapered portion 106'. The diameter of the non-tapered portion (the bore main portion 104) is preferably sized, as described below, to be between the diameters of the thickest ends and the thinnest ends of conventional leaders (preferably 0.014-0.020 inches), and so the leader may be pulled to an extent wherein the tapered portion fits tightly on the leader and the non-tapered portion also fits tightly on the leader and/or also compresses slightly to grip the leader. The diameter of the non-tapered portion (the bore main portion 104) is portrayed as constant in FIG. 19, but, in alternative embodiments, it may be tapered (albeit not as tapered as the tapered portion).

Figure 21:
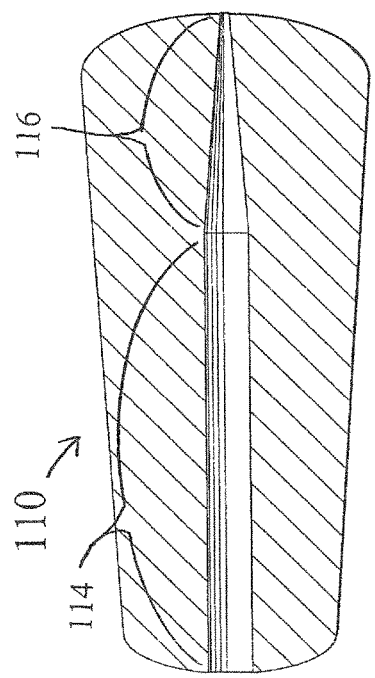
FIGS. 21 and 22 are cross-sectional views of another embodiment of float according to the invention that is the same as the float in FIGS. 19 and 20 except without the enlarged end opening. The leaders portrayed in FIGS. 21-22 are not shown in cross-section.
Figure 22:
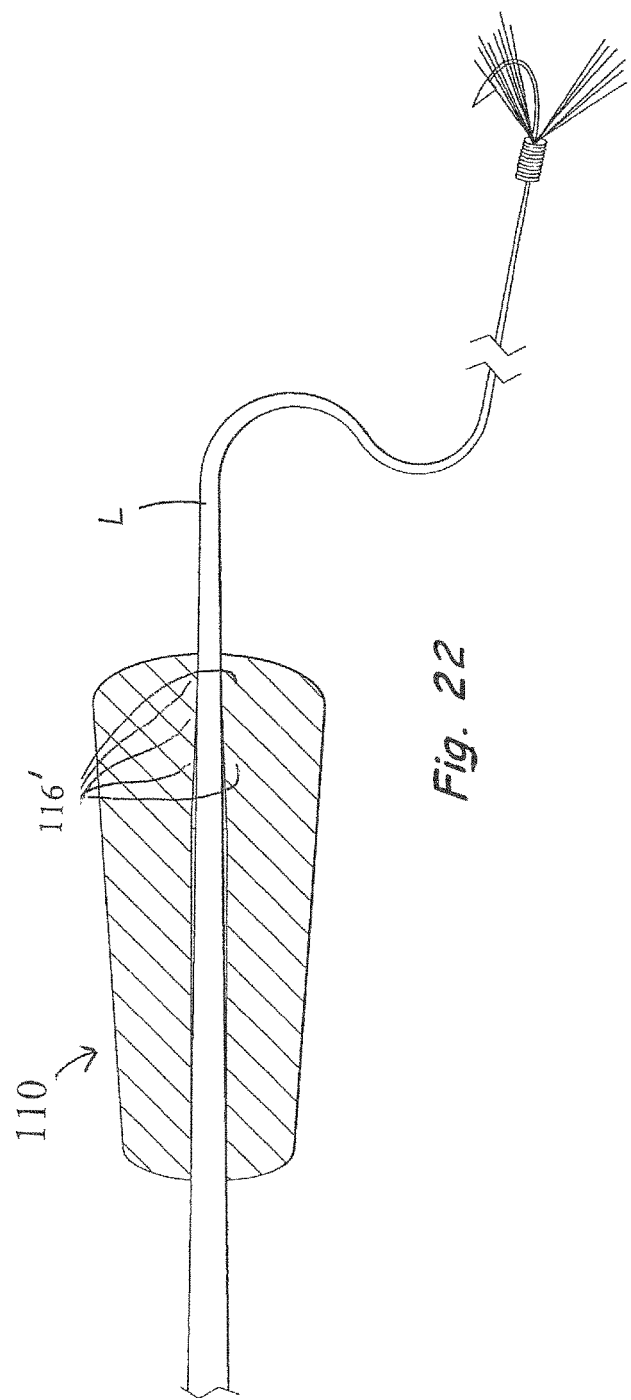

FIGS. 21 and 22 illustrate an embodiment 110 very similar to the float of FIGS. 19 and 20, except that this float 110 does not comprise an enlarged end opening for threading the leader into the float. It is believed that most fishermen will be able to thread the tippet end of the leader into and through the float easily enough, and that, after said threading, the tippet will be exposed from the fly-end of the float and the fisherman can grab the tippet to pull the leader as described above. The tapered portion 116 and the non-tapered portions (the bore main portion 114) of the float in FIGS. 21 and 22 will perform as described above for the float of FIGS. 19 and 20, wherein pulling the leader through the float 110 will cause float material in the area of the tapered portion to compress and/otherwise given way to the leader to an extent that the leader fits through said tapered portion and the leader is gripped firmly by the compressed tapered portion 116'. The diameter of the non-tapered portion is portrayed as constant, but, in alternative embodiments, it may also be tapered (albeit not as tapered as the tapered portion).

The structures and methods disclosed herein may be used to attach objects other than floats to a line, leader, wire, string, etc. Preferably, the methods of attachment involves solely a friction or interference fit between the line, leader, string, wire, etc., and the float or other object, and does not include rubber tubes or grommets, rubber pieces or wire loops, knotting or kinking of the leader/line. The preferred floats are attached to knotless, tapered, conventional leaders but may alternatively be attached to knotted, tapered, conventional leaders especially with the adaptation of a side-slot. For float embodiments that include taper in their bore, the dimensions of the extremities (butt and tip) of the leader may be used to calculate the amount of taper that may be desired in the bore to make the bore taper equal or approximately equal to the taper of the leader. The preferred floats may be installed above tippet knots (by sideways installation), where the axial sliding of the float, to frictionally "lock" the float onto the leader. The preferred floats, when used in fly fishing are secured on the leader, by the methods herein described, at about 2-10 feet from the fly and, most typically, about 3-8 feet from the fly.

Figure 23:
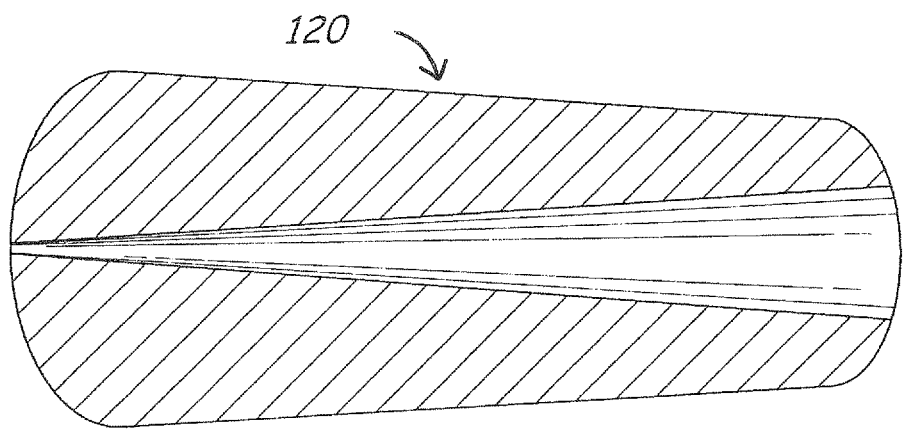
FIGS. 23-25 are side cross-sectional views of three embodiments of floats/indicators that each have a longitudinal bore, without any side-slot, so that the line/leader is inserted into the large-diameter end of the bore and pulled tight within the bore by abutment/engaging the smaller-diameter region/end of the bore.
Figure 24:
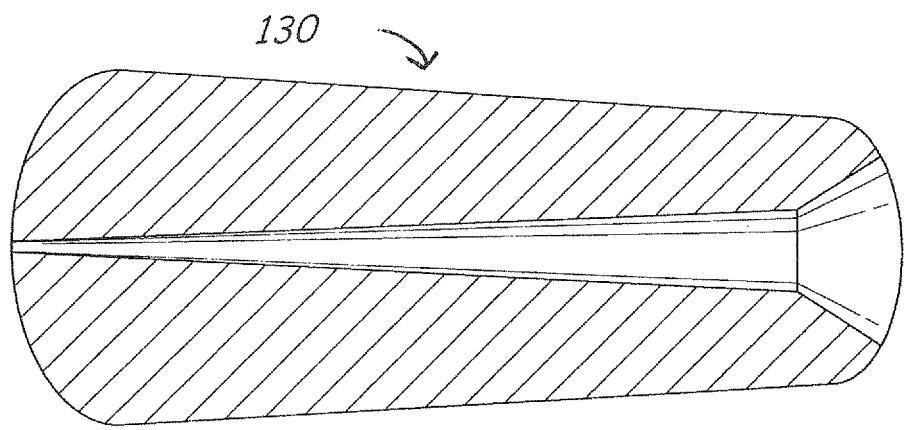
Figure 25:
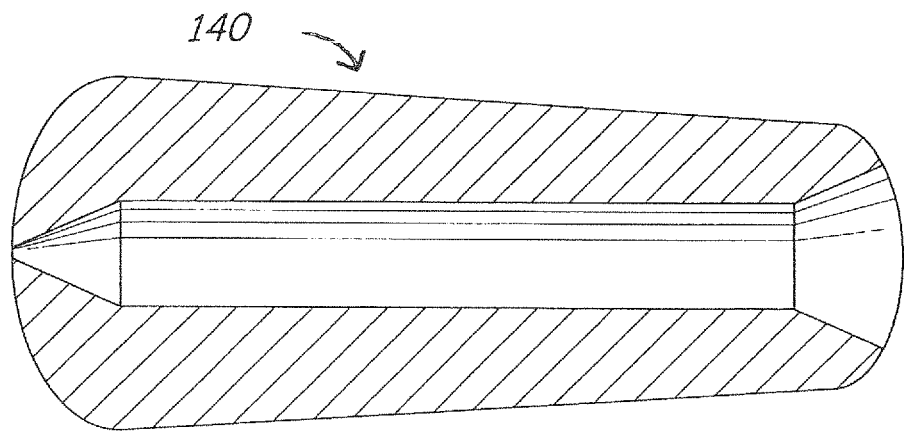
Figure 26:
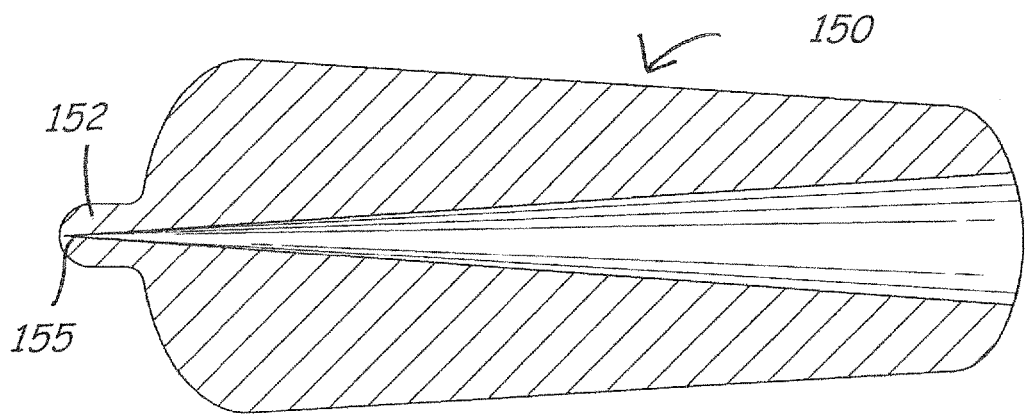
FIGS. 26-28 are similar to FIGS. 23-25, respectively, except that the float embodiments of FIGS. 26-28 include a protrusion (bump, knob, mound, extension, for example) that extends out from one end of the float and has inside the small-diameter of the bore.
Figure 27:
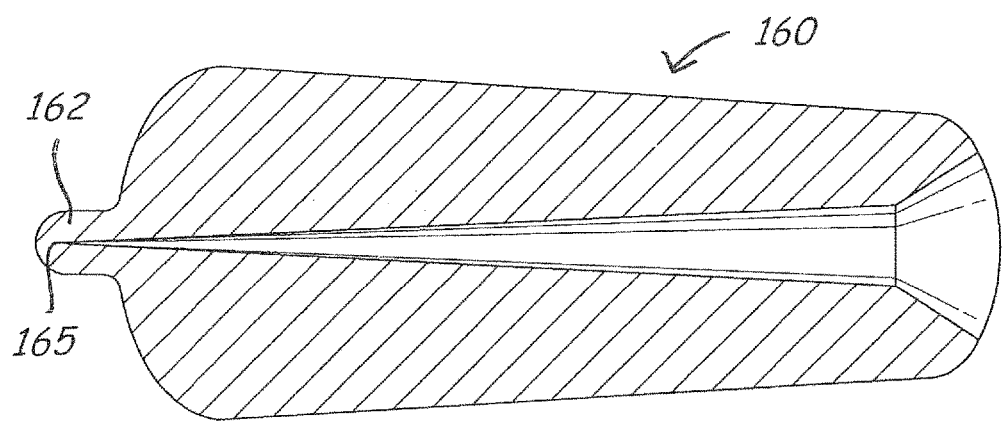
Figure 28:
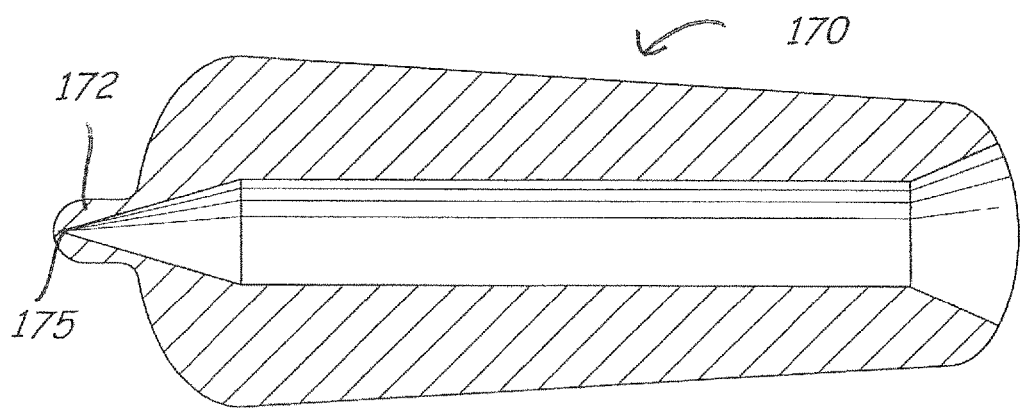
Figure 29:
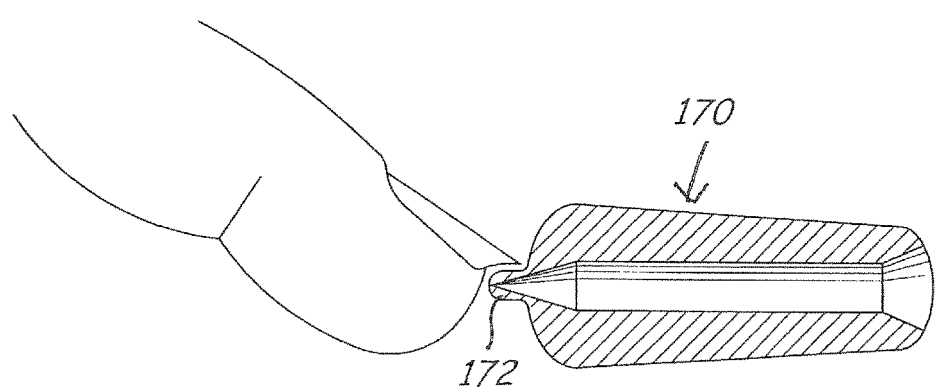
FIGS. 29-31 illustrate how an embodiment of the float (here, the embodiment from FIG. 28, as an example) may have its protrusion snapped or cut off to reveal the small-diameter end of the bore so that the line/leader may be pushed all the way through the float and pulled to tighten the line/leader in the float, especially in the small-diameter region of the float.
Figure 30:
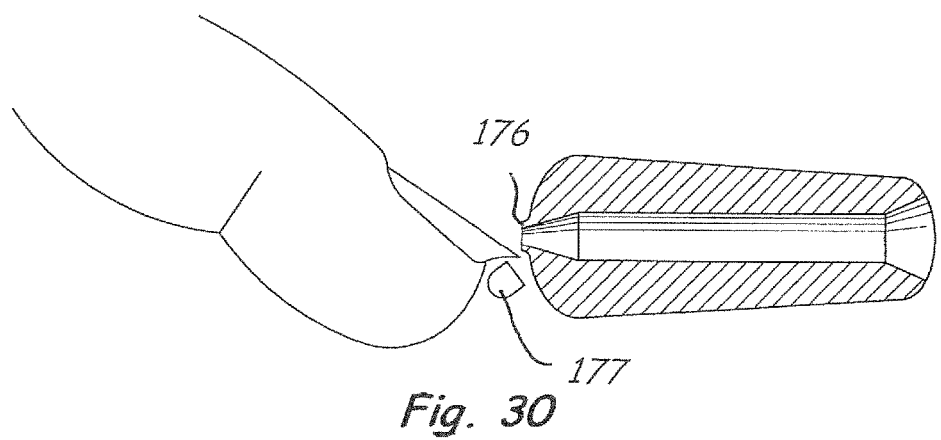
Figure 31:
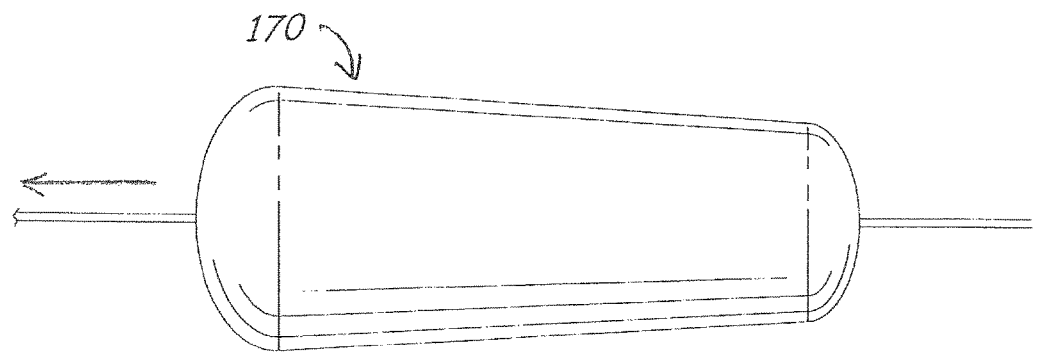

FIGS. 23-25 illustrate additional floats of the general shape and structure discussed above for FIGS. 17-22, wherein at least a portion of the longitudinal bore is tapered in order to tightly engage the line/leader. Preferably, these floats have no side slot/slit extending from the side of the float inward to the bore. Thus, the line/leader is inserted into the end of the float, into a larger-diameter region of the bore and pushed to the opposite end, where the user may grasp the line/leader, when a small length/portion of the line/leader is accessible outside the small diameter end of the bore, and pull the line/leader relative to the float until the float is tight on the line/leader. As discussed previously in this document, the float then preferably does not move on the line/leader unless the user purposely forces it to more. Therefore, the float is "fixed" to the line/leader by this structure and method during use, without grommets or other structure, and does not slide or more relative to the line/leader during use.

The float 120 in FIG. 23 has a tapered bore, with the diameter smoothly decreasing from one end to the other, without any "corners" or abrupt changes in diameter, so that the taper extends smoothly all the way from one end to the other. The float 130 in FIG. 24 has a smoothly tapered bore in most of the float, with an outwardly-flared bore end at the small end of the float, which makes line/leader insertion easier. The float 140 in FIG. 25 has a bore with a straight main region (non-tapered, constant diameter) and tapered ends; the bore tapers (flares) outward to a larger diameter at the small end of the float, and the bore tapers inward to a small diameter at the large end of the float. In these embodiments, the small diameter end of the bore is in the large diameter of the float, due to the preferred aerodynamics of the float (for the preferred cast and lay-out of the leader and fly and the preferred direction of inserting the line/leader) but alternative shapes and arrangements may be envisioned. In these embodiments, the small diameter bore end extends all the way to the outermost end of the float and is not blocked or closed; this way, the bore may be said to be open at both ends of the float prior to installation.

The diameter of the float bore of the embodiments in FIGS. 3-25 (or, in embodiments wherein different portions of the bore have different diameters, the "main diameter" or "full diameter," which is the diameter of a substantial portion (along >50% of the length) of the float bore) is preferably sized to be, on average, about midway between the smallest and the largest diameters of the leader. Conventional leaders typically have the following diameters:

| Leader Size | Butt Diameter, inches (Thickest End) | Tip Diameter, inches (Thinnest End) |
|---|---|---|
| 0x | 0.026 | 0.011 |
| 1x | 0.026 | 0.010 |
| 2x | 0.024 | 0.009 |
| 3x | 0.024 | 0.008 |
| 4x | 0.023 | 0.007 |

-continued

| Leader Size | Butt Diameter, inches (Thickest End) | Tip Diameter, inches (Thinnest End) |
|---|---|---|
| 5x | 0.022 | 0.006 |
| 6x | 0.021 | 0.005 |
| 7x | 0.021 | 0.004 |

Therefore, a bore main diameter (or average bore main diameter in cases wherein the bore main portion is tapered as in FIG. 18) of less than 0.021 inches and greater than 0.011 inches would attach, as described in the preferred methods, to any and all of the above-listed tapered leaders. A bore main diameter (or average bore main diameter) in the range of 0.014-0.020 inches is preferred and would attach, as described in the preferred methods, to an acceptable generally middle location on any and all of these leaders.

FIGS. 26-31 illustrate alternative embodiments, floats 150, 160, 170, that employ an extra feature for ensuring quality and accurate molding or forming of the float to have a properly sized and shaped bore, especially at the small diameter bore end. Also, this extra feature may ensure convenient use and a tight fit of a line/leader with the float. The extra feature is a protrusion 152, 162, 172 from one end of the float, into which the small diameter bore end extends. The protrusion in FIGS. 26-31 is a rounded "mound" integral with the outermost surface of the large end of the float, but it may also be other shapes, such as more oval, longer, and/or flatter. It is preferred that the protrusion be significantly smaller in diameter than the end of the float main body from which it protrudes, for example, in the range of ⅓-1/20 of the diameter of the end of the main body, and, more preferably, in the range of ⅕-1/10 of the diameter of said end of the main body. The protrusion is preferably closed-ended at its outermost end, with the small diameter bore end preferably extending nearly all the way to said outermost surface of the protrusion. In some embodiments, the small diameter bore end may actually extend all the way to the outermost surface of the protrusion (for example, the tip 155, 165, 175 where the bore end diameter is extremely small). In the preferred embodiments, however, there is some float material between the tip of the bore and the outermost surface of the protrusion. Therefore, prior to installation, one may call the bore "closed" or "covered" on one end of the float.

Therefore, when installation begins, a user will snap or cut off at least a portion of the protrusion, in order to reveal the small diameter bore end, specifically, the bore end minus a very-small-diameter portion of the bore end from the bore end's outermost region. This way, the bore end is revealed and accessible at a location 176 wherein the bore end is the desired diameter for receiving the line/leader and for the user being able to insert the line/leader all the way through the bore and access it at the end of the float (the end to the left in FIGS. 26-31). The snapping/cutting of the outer portion 177 of the protrusion may be done by a fingernail, a clipper, or other device. In some embodiments, the user may remove, by cutting or scraping, more of the protrusion, even extending slightly into the main body of the bore, but, with proper sizing of the bore relative to the line/leader, this should not be necessary. Removing just the protrusion or a substantial part of the protrusion retains the strength and operability of the main body of the float.

As discussed for FIGS. 23-25 (and for many or all of the other embodiments earlier in this document), the line/leader will engage and preferably slightly compress the surface of at least the small diameter of the bore of the floats 150, 160, 170. This engagement and slight compression will be, for the embodiments represented by FIGS. 26-31, particularly in the tapered region of the bore remaining after removal of the protrusion. The relative diameters and dimensions of the bore and the line/leader, as discussed earlier, are preferably adapted so that a tight and immovable fit, under the normal forces of use in fishing, is made between the line/leader, and this may be done with some compression (from the inside out) of the material of the float. For example, a Styrofoam™ or other foam or plastic may be used, and it may compress slightly when the line/leader is pulled relative to the float to be tight in the float. The preferred protrusion of these embodiments is integrally formed by molding of the float, and the protrusion is preferably the same material as the main body of the float.

The preferred embodiments of the float/strike indicator are employed in fly-fishing with a tapered leader; they may be extremely light-weight, are non-moving relative to the leader at all times after installation and during use, and do not interfere with, or cause significant resistance during, fly-casting and then layout on the water with little or no splash. Many embodiments of the invention may also be employed in bait or lure fishing on a fishing line. The extreme light weight of the floats/indicators is possible because they require no grommets or other attachment members and rely solely on the frictional/interference fit between the float/indicator and the leader/line.

Current conventional leaders are typically made of nylon and/or fluorocarbon, but the leaders in this application also may be other materials. Certain embodiments of the invented floats are made of polystyrene, polyurethane, or other polymers that are light weight and significantly lighter that water. It should be noted that, when embodiments such as those shown in FIGS. 3-31 are made entirely of closed-cell polymeric foam or other compressible materials, the line/leader may slightly compress the surface of the bore, at least the smaller-diameter portion(s) of the bore, as discussed above. In other words, under the forces of installation and fishing, compression (from the inside out) of the material of the float may occur. For example, a float made entirely of STYROFOAM™ or other foam will compress slightly when the line/leader is pulled relative to the float to be tight in the float. The inventor has determined that making the floats entirely of compressible materials, and the resulting compression can be disadvantageous in certain embodiments, as the float tends to loosen on the leader and become dislodged from the desired location on the leader. In other words, the inventor has discovered that, if the bore is surrounded/defined by materials that are more compressible than the leader, attachment of the float to the leader may not be optimal.

Especially-Preferred Embodiments:

The inventor has determined that the installation and operation of the float is enhanced greatly if the bore surface is relatively incompressible compared to the leader. However, it is still desired that the total weight of the float be such that the float, in most embodiments, will float on water. Therefore, the especially-preferred embodiments of the float will be made of multiple materials, specifically a light weight, low-density main body that may be compressible, and a "non-compressible" (at least less compressible than the leader) bore liner or insert that will typically be more dense than the main body material.

The inventor has determined that an insert has particular advantages, for example, the main body may be molded around a previously-fabricated insert, and the insert may serve multiple roles. Said multiple roles may include: a) optimizing installation on the leader by providing a very tight interference fit due to the bore surface being less compressible than the leader and hence tending to compress the leader rather than the bore surface itself compressing, b) anchoring and stabilizing the non-compressible bore surface inside the float to make the float more durable and re-usable, especially so that the large forces applied during pushing/pulling the float up the leader to its final location will not damage the float, and c) stabilizing and reinforcing the side-slot when present. With such a float, the non-compressible surfaces are retained securely and permanently inside the float main body despite the forces applied during installation and use. For example, the fisherman may apply a large amount of force to the polymeric foam main body to force the float along the larger-diameter end of the leader and to compress the leader, and also in the reverse direction to remove the float from the leader for replacement or reuse, but the preferred embodiments with non-compressible inserts tend to remain intact and useful during both these steps, as well as during use during fishing.

Figure 32:
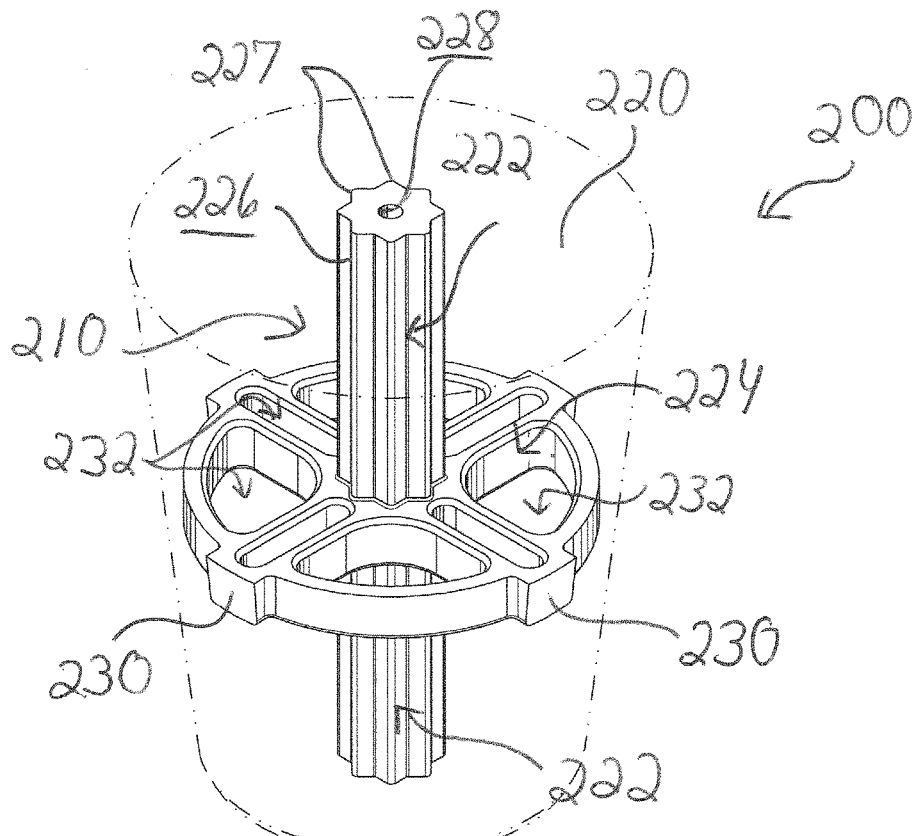
FIG. 32 is a perspective side view of one embodiment from an especially-preferred set of embodiments that comprises an insert with a non-compressible surface forming the longitudinal bore.
Figure 33:
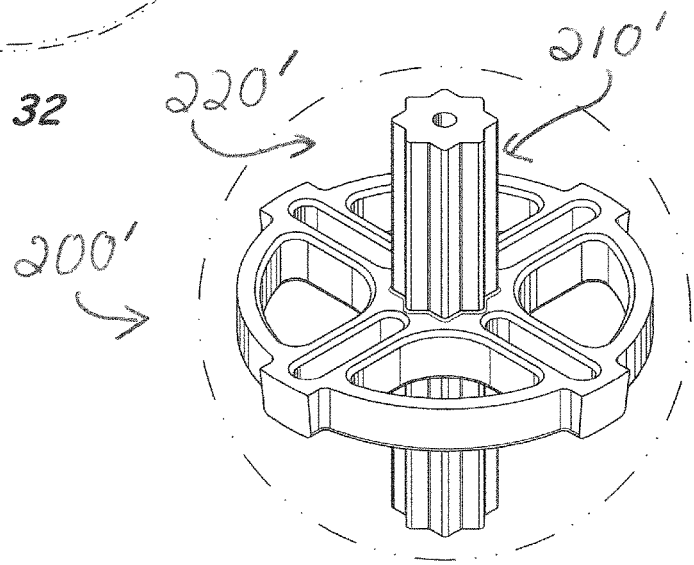
FIG. 33 is a perspective side view of an alternative embodiment including an insert, similar to the embodiment of FIG. 32 except the longitudinal portion of the insert is shortened to have a length about equal to the diameter of the transverse flange, for example, for fitting in a spherical main body of the float.

Referring to the Especially-Preferred Embodiments in FIGS. 32-59:

FIG. 32 portrays float 200 that comprises an insert 210 made substantially, or preferably entirely of non-compressible material (as explained above, incompressible, substantially incompressible, or at least less compressible than the leader). The insert 210 is inside a closed-cell polymeric foam main body 220, for example, of Styrofoam™. The insert 210 comprises a longitudinal portion (or "bore portion 222") and a radial portion (or "flange 224"). The bore portion 222 is hollow, and may be a generally straight tube having an outer axial surface 226 that comprises radial protrusions 227 or other axial ridges or texture, all along the length of the axial surface 226. These protrusions 227 prevent or help prevent rotation of the main body 220 relative to the bore portion 222, due to the main body material extending into the depressions between each of the protrusions 227. This is particularly important during installation and removal of the float from the leader, when large forces may be applied to the main body, either to force it into the tight fit on the leader that may compress the leader or to force it away from said tight fit. While the compression of the leader is difficult to measure and may be varying amounts, examples may include compression that results in a reduction of the diameter of the leader of 0.001% up to about 5 percent, for example, and more typically from 0.1% up to about 2 percent.

Figure 34:
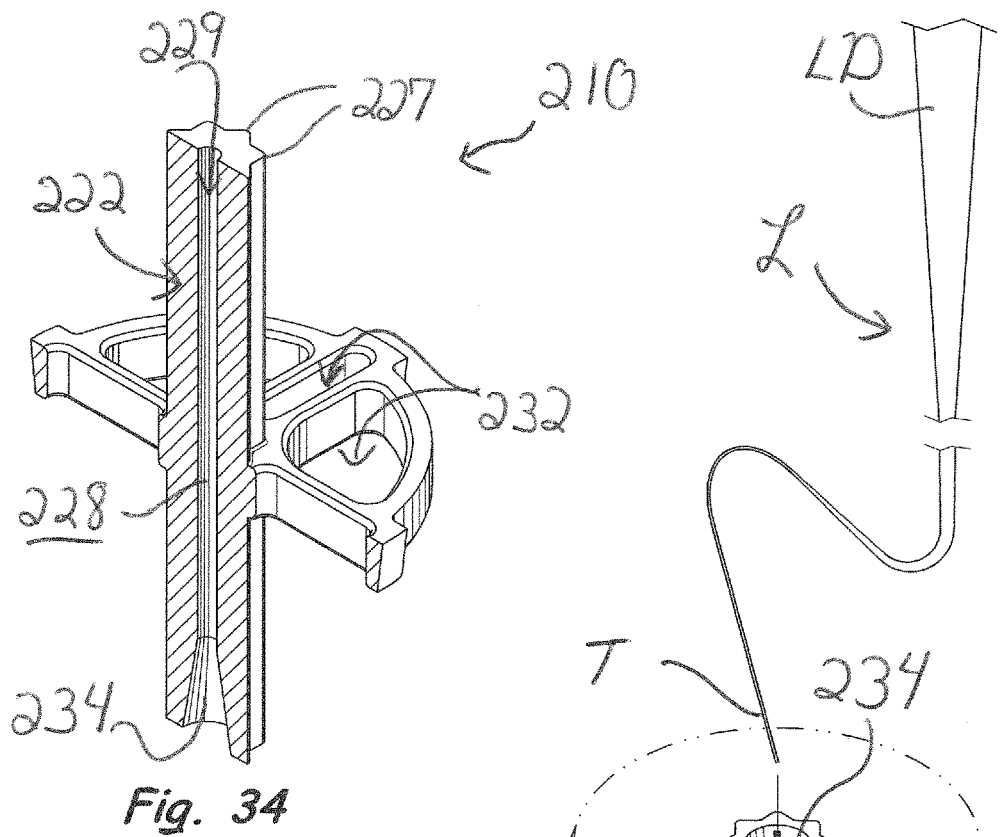
FIG. 34 is a longitudinal (axial) cross-sectional perspective view of the insert of FIG. 32.

The bore portion 222 comprises an inner surface 228 that surrounds and defines the bore 229 of the float (see also FIG. 34). Thus surface 228 and preferably the entire insert 210 is substantially or entirely incompressible, or at least less compressible than the leader (again and hereafter, referred to as being "non-compressible" for ease of writing). Preferably, the surface 228 is smooth and non-rubbery, as the attachment and installation of the float 200 is specially-adapted for a tight fit that may compress the leader, rather than a rubbery, tacky, or sticky gripping of the leader.

It may be noted that the dimensions, and the relative dimensions, of the bore portion 222 and the flange 224 may be altered from those shown in FIG. 32. For example, as shown by the float 200' in FIG. 33, a bore portion of less length than that shown in FIG. 32 may allow an insert 210' to be placed in a spherical main body rather than an elongated main body.

Referring back to float 200, the flange 224 extends out radially (transversely relative to the longitudinal axis of the bore portion 222), all the way around the bore portion 222 and generally centered between the two ends of the bore portion. The flange 224 may serve to stabilize the insert 210 inside a mold during molding/forming, and inside the main body during use. The flange 224 helps prevent the forces applied to the main body, especially during installation and/or removal, from separating the main body from the insert. While the protrusions 227 of the bore portion, and the extremities 230 of the flange, help prevent rotation of the main body relative to the bore portion 222. The upper and lower surfaces of the flanges help prevent axial movement of the main body relative to the insert. When the fisherman pushes the float along the leader with such force that it may compress the leader, the flange 224 allows transfer of the force on the main body by the fisherman to the bore portion 222 without breaking the float or separating the main body from the insert. In certain embodiments, the flange 224 extends all the way to the outer surface of the float, so that the outer extremities 230 of the flange are visible at the outer surface of the float. For example, see extremities 330 that are visible in FIG. 39.

Apertures 232 may be provided in the flange 224, and preferably extend axially all the way through the flange. The material of the main body 220 preferably extends into and through these apertures 232, further securing the main body 220 to the flange for prevention of relative movement of the main body and the insert 210. The entry of material into and through the apertures 232 may be particularly important in embodiments wherein the main body is molded around a previously-made insert 210, so that the flowing material entirely fills the void space of the mold (not occupied by the previously-made insert) for excellent securement of the main body to the insert, and for prevention of voids/vacancies in the main body of the finished float. In embodiments wherein the flange 224 extends all the way out to, or near to, the outer surface of the float, the apertures may be particularly important, as it would otherwise be difficult for the flowing material to flow around the flange. In embodiments wherein the flange does not extend all the way out to or near the outer surface of the float, flange apertures may be optional.

Figure 35:
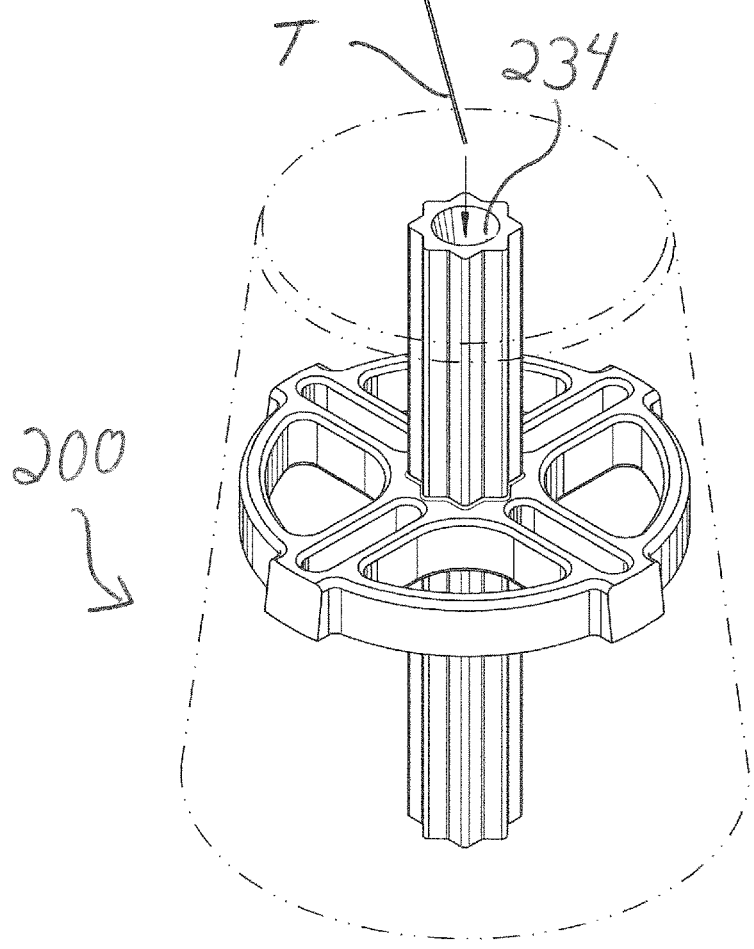
FIG. 35 is a perspective side view of the float of FIG. 32 in a first step of installing the float on a fly-fishing leader by axial insertion of the tip end of the leader through the bore.
Figure 38:
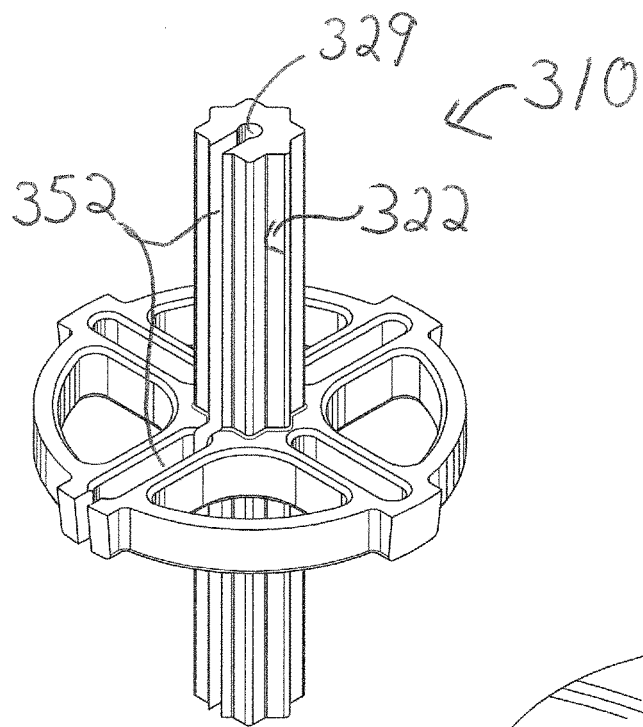
FIG. 38 is a perspective side view of the insert of FIG. 37, without the main body around the insert.
Figure 39:
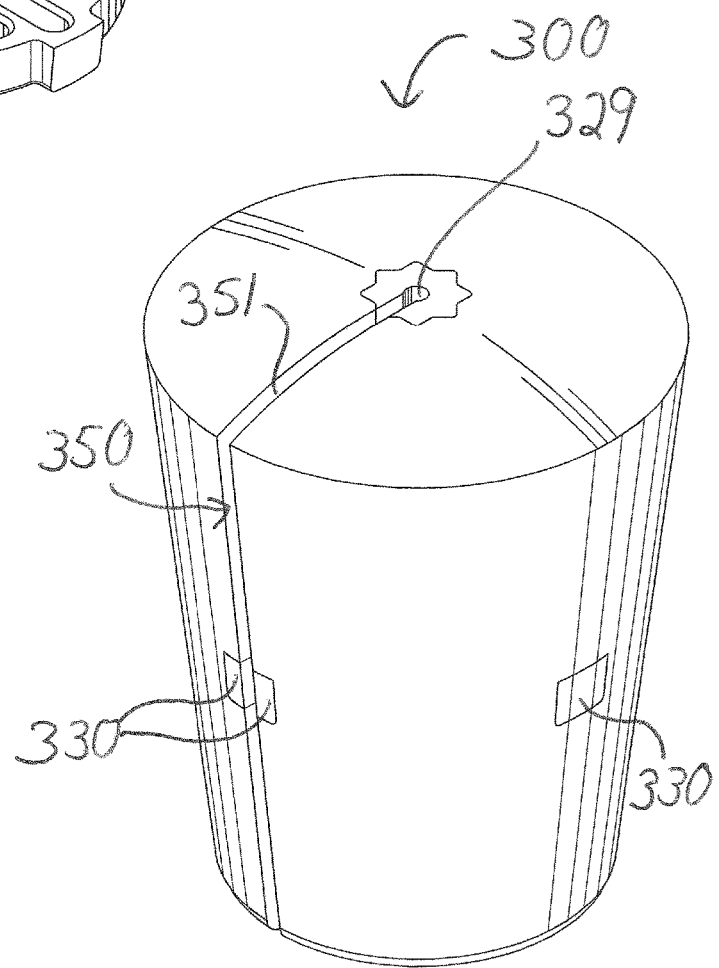
FIG. 39 is a perspective side view of the float of FIG. 37, wherein the main body of the float is opaque and therefore the main portion is mainly visible to the user.

One may note that the bore 229 of the insert (and hence the float) is substantially straight and of a single diameter, except that one end comprises a tapered, funnel-like shape. The funnel end 234 is desirable in preferably a single end of the float, specifically the end that will face away from the fly. This relatively-enlarged portion of the bore allows easier insertion of the tip end T of the leader L, in a first/early step of installation of the float on the leader. As shown in FIG. 35, the float 200 is orientated so that the narrow end of the main body (corresponding to the funnel end 234 of the insert) receives the tip end T before the fly F is attached to the tip end T, and this results in the narrow end of the float moving forward in the air during the cast, with the broader end and the fly behind it, for improved aerodynamics.

As portrayed in FIG. 36, in a second/later step of installation, the float 200 is pushed/pulled relative to the leader (or the leader pulled relative to the float) so that the float 200 moves toward the larger-diameter end LD of the leader L. This is done until the above-described very tight interference fit occurs between the bore 229 and the leader. The taper of the leader L is exaggerated somewhat in the figures, but it will be understood that, during this process, the float reaches a location on the leader where at least a portion of the bore 229 matches the diameter of the leader, and further movement/pushing of the float to an even larger-diameter portion of the leader (to the "desired final location") will result in the desired tight fit and some compression of the leader, and the resulting securement of the float 200 to the leader L without grommets or other fasteners. In certain embodiments, there is about 6 inches of "play", that is, about 6 inches of distance along the leader from where a given float will begin to experience resistance (corresponding generally to said location on the leader where at least a portion of the bore 229 matches the diameter of the leader) to the tightest and most-compressed-leader location that is convenient and reasonable for the given float and desired by the user. Typically, the installer may push/pull the float to any location within that region of "play" as desired for tightness of fit and/or for desired location (the "desired final location") for casting and fishing. It will be noted that the first resistance may be caused at the transition region between the funnel end and the main, straight portion of the bore; however, after further pulling/pushing to move the float to the "desired final location", the tight fit and compression of the leader may be present along a significant portion or the entire length of the bore.

Alternative float 300, portrayed in FIGS. 37, 39, 30 and 41, is similar to float 200, except that the insert 310 and the main body 320 comprise a side-slot 350, formed by a side-slot 351 in the main body communicating with the side-slot 352 in the insert 310. The side-slot 352 of the insert 310 extends all the way from the outer perimeter of the flange, through the flange 324, and to the bore 329, and also extends all along the length of the bore portion 322. This way, there is a passageway from the outside of the float to the bore, for insertion of the leader radially or "sideways" into the bore 329, rather than "threading" the tip end T into the bore. As explained above, this may be a great advantage for leaders that comprise a knot K along their length (see FIGS. 40 and 41).

Figure 40:
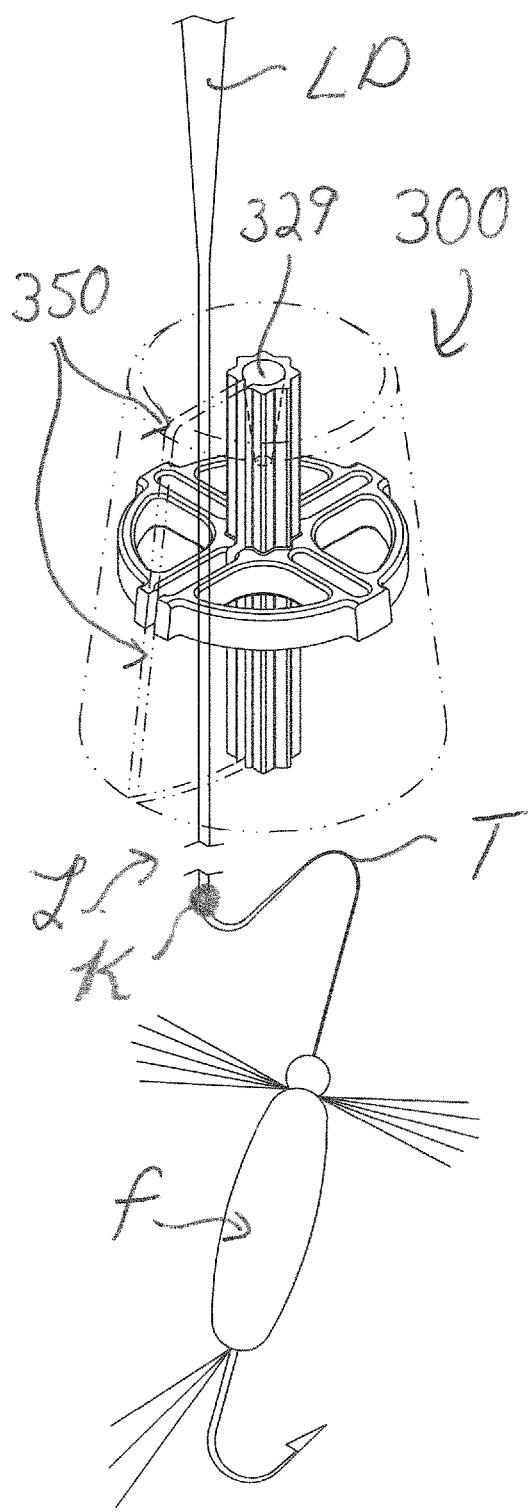
FIG. 40 is a perspective side view of the float of FIGS. 37 and 39 in a first step of installing the float on a fly-fishing leader by radial (transverse) insertion of a smaller-diameter portion of the leader through the side-slot and into the bore.

As shown in FIG. 40, the float 300 is orientated so that the narrow end of the main body (which may correspond to the optional funnel end of such a side-slot insert) is away from the tip end T and the fly F (typically already attached to the tip end). The leader L is then slid into the side-slot 350, until it enters the bore 329. This orientation of this end-to-end-non-symmetrical float relative to the fly will result in the narrow end of the float moving forward in the air during the cast, for improved aerodynamics.

Figure 41:
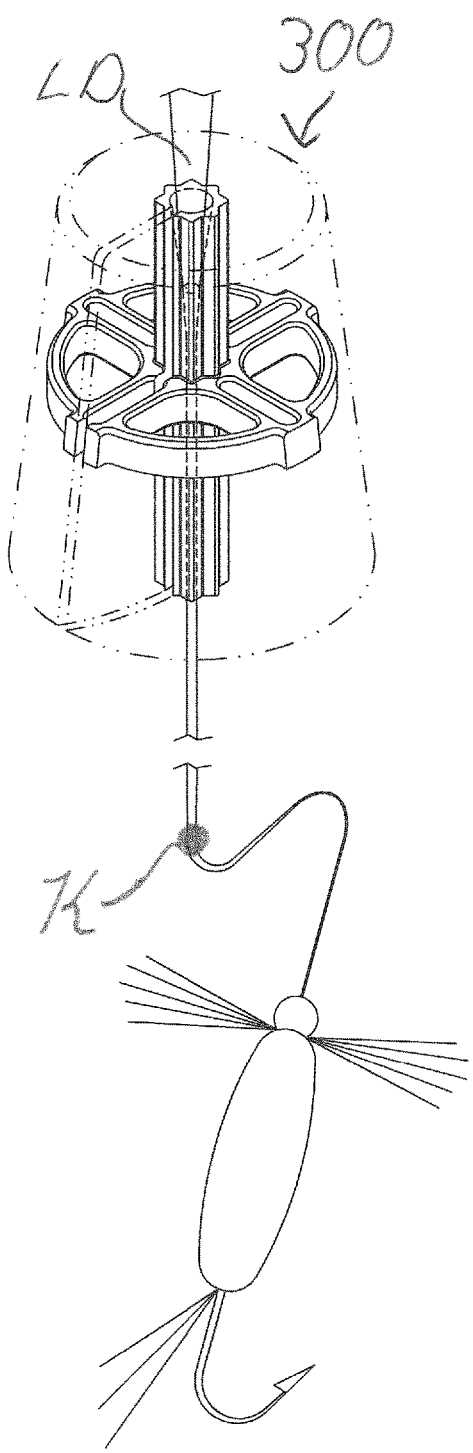
FIG. 41 is a perspective side view of a second step of installing the float of FIG. 40 on the leader, by pushing the float, after the smaller-diameter leader portion is in the bore, toward the larger-diameter end of the leader until a tight interference fit is formed between the insert and the leader.

As portrayed in FIG. 41, in a second/later step of installation, the float 300 is pushed/pulled relative to the leader (or the leader pulled relative to the float) so that the float 300 moves toward the larger-diameter end LD of the leader L. This is done until the above-described very tight interference fit occurs between the bore 329 and the leader. Again, the taper of the leader L is exaggerated somewhat in the figures, but it will be understood that, during this process, the float reaches a portion of the leader where at least a portion of the bore 329 matches the diameter of the leader and the first significant resistance is felt, and further movement/pushing of the float to an even larger-diameter portion of the leader will result in the desired tight fit and some compression of the leader, and the resulting securement of the float 300 to the leader L without grommets or other fasteners at the "desired final location". Again, it may be noted that said first resistance may start at the transition region between the funnel end and the main, straight portion of the bore, but, after further forcing of the float toward the larger-diameter portion LD of the leader, the tight fit and compression of the leader may be present along a significant portion or the entire length of the bore.

Figure 42:
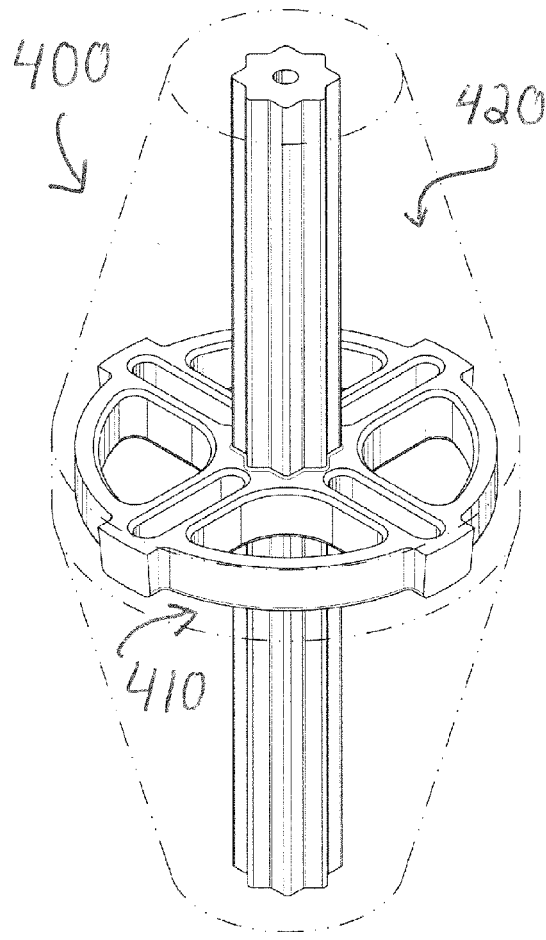
FIG. 42 is an alternative float embodiment comprising an insert with a longitudinal portion of greater length than the inserts of FIGS. 32-41, and a main body comprising two opposing truncated conical portions.
Figure 43:
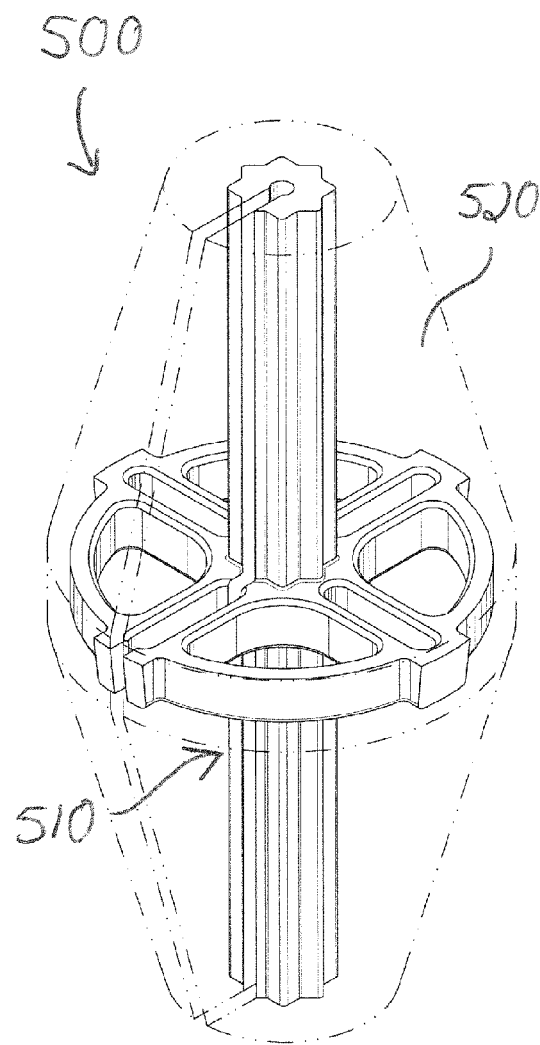
FIG. 43 portrays an alternative float, similar to that in FIG. 42 but comprising a side-slot for radial entry of the leader into the bore.

FIGS. 42 and 43 portray alternative embodiments of a float with a non-compressible bore surface, wherein float 400 in FIG. 42 is a no-side-slot embodiment, and float 500 in FIG. 43 is a side-slot embodiment. The main body 420, 520 of each float may be described as a double-truncated-cone, with both ends of the main body being smaller in diameter than a generally cylindrical central region. The inserts 410, 510 of these floats are very similar to inserts 210 and 310, respectively, with the bore portions being longer to extend to the ends of these longer floats. It may be noted that floats 400, 500 are each generally symmetrical, both end-to-end and side-to-side.

Figure 44:
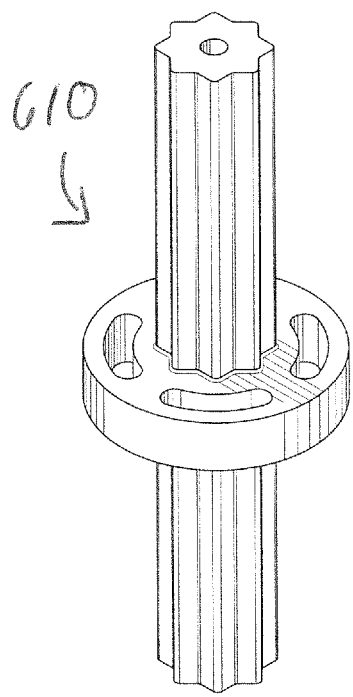
FIGS. 44-59 portray alternative floats and/or alternative inserts for floats, wherein, specifically.

FIG. 44 portrays an alternative insert 610 that might be used in a significantly elongated float main body. The flange of the insert 610 has a small diameter and has apertures that may be especially useful for enhanced material flow if a small-diameter main body is molded around the insert 610. If, instead, the main body molded around the insert is substantially larger in diameter than the flange of this insert, then the apertures in this flange may be optional, as the main body material may flow easily around this relatively small flange.

Figure 45:
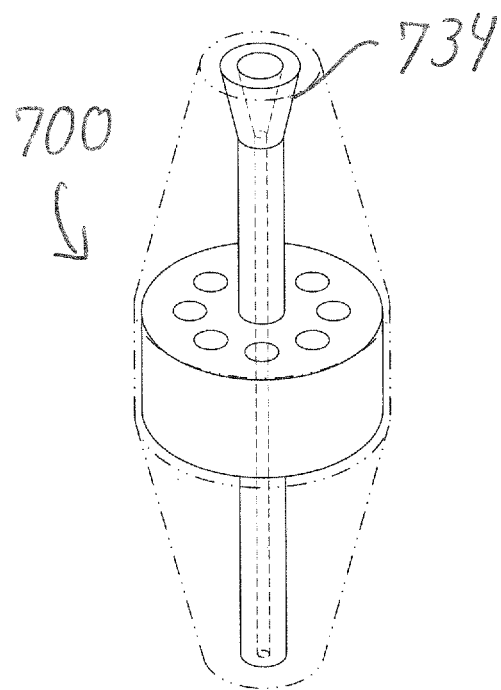
Figure 46:
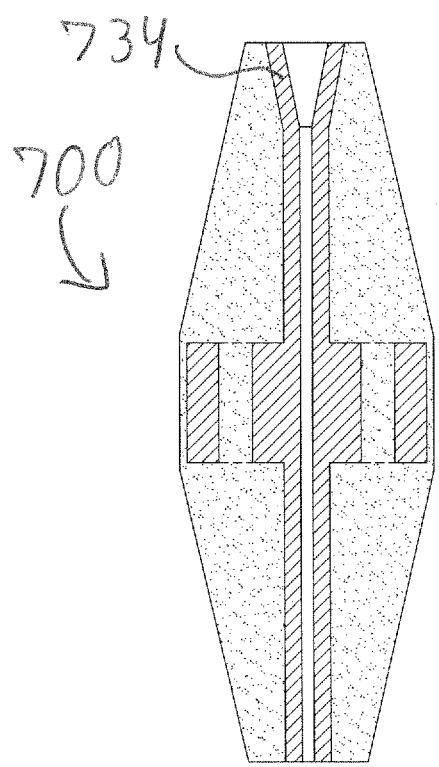
Figure 47:
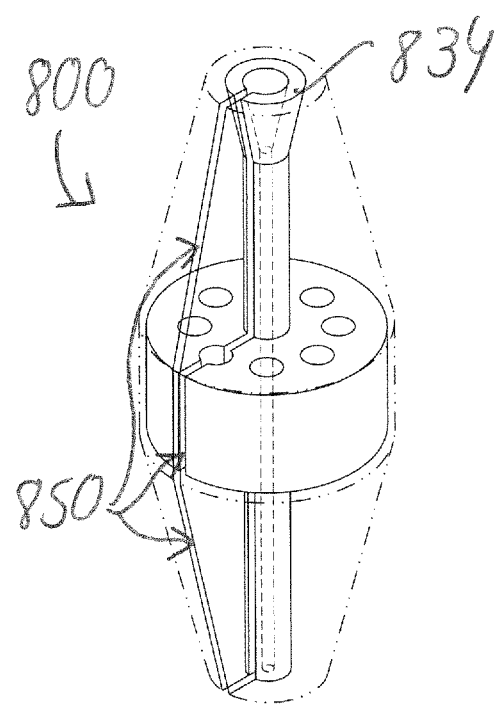
Figure 48:
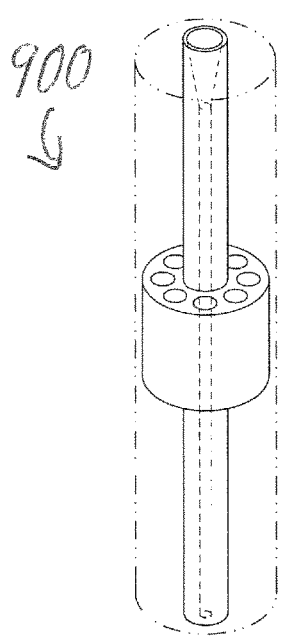
Figure 49:
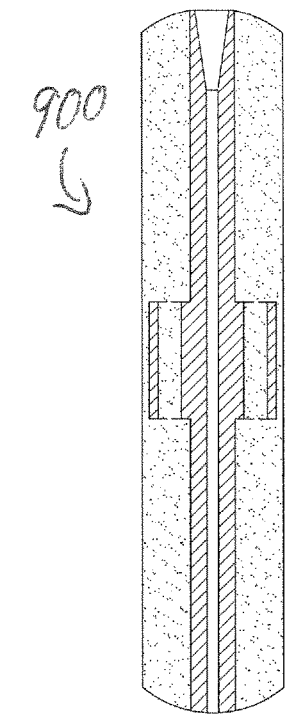
Figure 50:
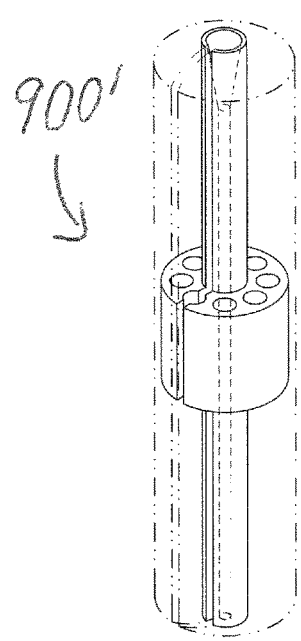
Figure 51:
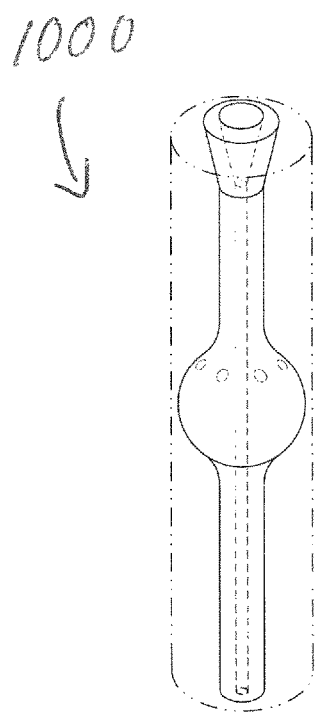
Figure 52:
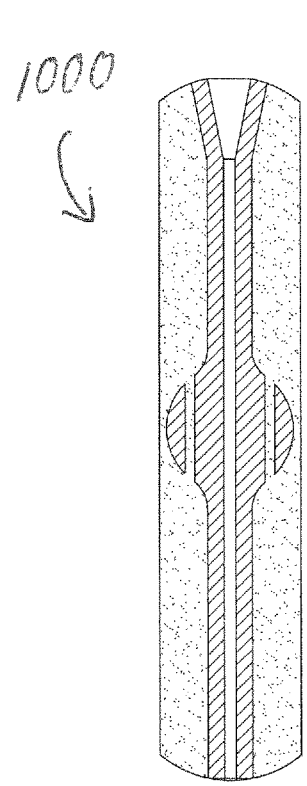
Figure 53:
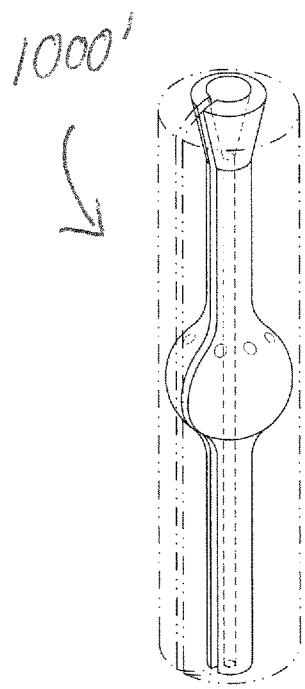
Figure 54:
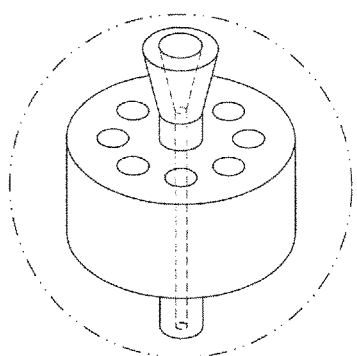
Figure 55:
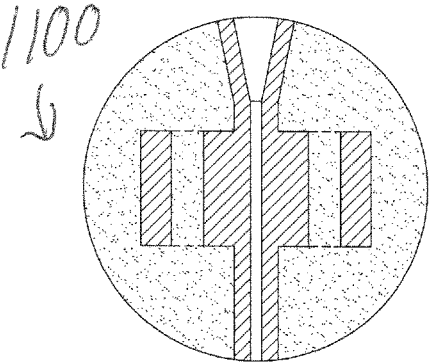
Figure 56:
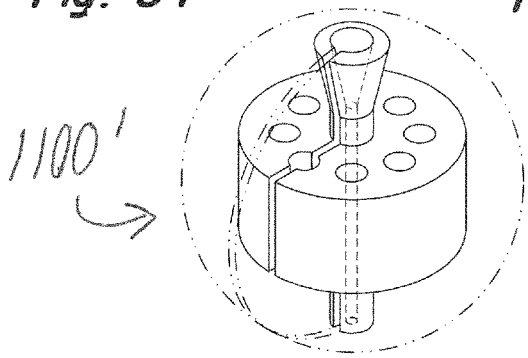
Figure 57:
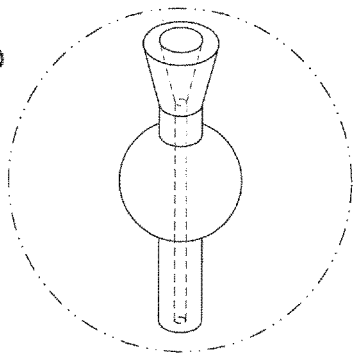
Figure 58:
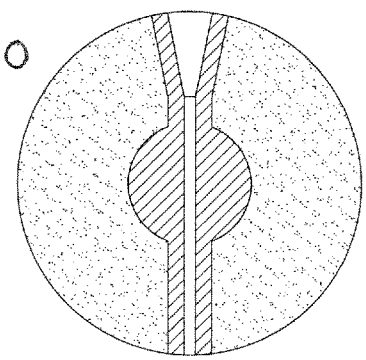
Figure 59:
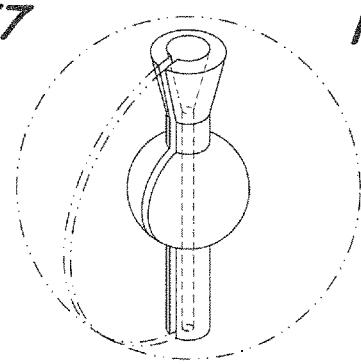

FIGS. 45 and 46 portray an alternative float 700 with a flared funnel end 734, and a relatively-thick flange 724 with circular apertures. FIG. 47 portrays a very similar float 800, with an optional flared funnel end 834 and a side-slot 850. The flared funnel ends 734, 834 satisfy the goal of providing an enlarged bore end for threading of a tip end through the bore, but with structure that includes an outwardly-flared inner surface and also an outwardly-flared outer surface, rather than just the tapered inner surface (and straight outer surface) of the funnel end 234 in FIG. 34. The outwardly-flared outer surface of the funnel end 734, 834 may make certain molding or other manufacturing methods difficult, so a non-outwardly-flared ("straight") outer surface is preferred for most bore portions and funnel ends.

Alternative floats 900 and 900' (the later having a side-slot) illustrate long, "pill-shaped" floats, each having one funnel end with the preferred non-outwardly-flared outer surface. Alternative floats 1000 and 1000' (the later having a side-slot) illustrate long, "pill-shaped" floats, each having one funnel end with the less-preferred outwardly-flared outer surface, and each having a generally spherical flange with axial apertures. The flanges of floats 1000 and 1000' reach to, or near to, the outer surface of the main body in a similar manner to the flanges described and portrayed earlier in this document. Alternative floats 1100 and 1100' (the later having a side-slot) illustrate spherical or generally spherical floats, each having one funnel end with the less-preferred outwardly-flared outer surface, and a cylindrical flange that does not reach all the way to the outer surface of the main body of the float. Alternative floats 1200, 1200' (the later having a side-slot) illustrate spherical or generally spherical floats, each having one funnel end with the less-preferred outwardly-flared outer surface, and a spherical/generally-spherical flange that does not reach all the way to the outer surface of the main body of the float. The flanges of floats 1200, 1200' do not include axial apertures, but instead the flanges are solid, serving as examples of flanges that need not include apertures or spaces for flowing main body material, because the main body material will flow easily around the flanges or because other manufacturing methods for the floats do not require said apertures.

In the especially-preferred embodiments having inserts, such as those illustrated in FIGS. 32-59, the bore of the insert may be sized to tightly fit in a particular region of the leader, as desired by the fly-fisherman, with said desired regions being anywhere from 3-4 feet from the fly up to at or very near the butt end of the leader. For example, a float may have a small insert bore to fit nearer the tippet (or small-diameter end), a middle-sized insert bore to fit midway along the leader (about midway between the larger-diameter end and the smallest-diameter end), or a larger insert bore sized to tightly fit "high up" on the leader (at or near the largest-diameter end of the leader). For each bore diameter, the side-slot, if present, is typically smaller in width (across the slot) than the bore diameter, so that the float easily may be slide radially onto a smaller-diameter region of the leader compared to the diameter of the leader at the float's desired final location where the leader diameter will be greater than the width of the side-slot. This smaller width for the side-slot helps insure that the leader at said desired final location float will not slide out of the float through the side-slot.

Examples of bore diameters and corresponding side-slot widths may include:

| Bore Diameter (excluding funnel if any), inches | Side-slot Width, inches. |
|---|---|
| 0.021 | 0.014 |
| 0.019 | 0.013 |
| 0.017 | 0.012 |
| 0.016 | 0.012 |
| 0.015 | 0.010 |
| 0.010 | 0.006 |

Given the butt end (largest diameter) and tip end (smallest diameter) data listed above in this document for conventional tapered leaders, one may see that floats constructed with the various bore and slot dimensions immediately above this paragraph may be tailored to find their desired final location at various places along conventional leaders.

The size and weight of the preferred floats with inserts may be tailored to accomplish the desired goals for a particular fly weight and particular style of fly-fishing. For example, for heavier/weighted flies, a larger float may be necessary to keep the float on top of the water, where it will serve well as a strike indicator because the fly may be submerged. Certain embodiments of small floats may be, for example, approximately ¾ inch long by about ½ inch in diameter, and in the range of a weight of 1-10 grains. For a reference, a standard fly for fly-fishing weighs about 2 grains, so that the most preferred float embodiments are about the same weight as a fly. Larger floats for said heavier/weighted flies, for example, may be up to 3-4 inches long, with especially-preferred larger floats being of the symmetrical style (symmetrical both end-to-end and side-to-side) shown in FIGS. 42 and 43.

Examples of densities for the overall (total) float include, but are not necessarily limited to, about 0.15 or fewer grams per cubic centimeter, or, in other words, about an order of magnitude less dense than water. Such overall densities may be achieved with a main body of closed-cell polystyrene foam having a density much less than water (for example, in the range of about 0.01-0.05 grams per cubic centimeter), and an insert having a greater density than the polystyrene foam but still smaller than the density of water, and, in certain embodiments, the insert having a smaller volume than the volume of the main body. For example, polypropylene is a preferred material for the insert, with an example density of about 0-0.85-0.95 grams per cubic centimeter (slightly less dense than water).

Certain embodiments comprise float apparatus as described herein, and/or methods of installing and/or using the floats.

Although this invention has been described above with reference to certain particular means, materials, and embodiments, it is to be understood that the invention is not limited to these disclosed particulars, but extends instead to all equivalents within the broad scope of the claims.

The invention claimed is:

1. A fishing leader and float combination comprising:
a tapered fly-fishing leader having a tip end with a diameter, a butt end with a diameter, and a tapered, axial outer surface extending from said tip end to said butt end, wherein the tip end diameter is smaller than the diameter of the butt end;
a float attached to said leader, the float comprising a main body of compressible material formed around an insert of different material than the main body, wherein the insert comprises an elongated longitudinal portion having a first end and second end and a longitudinal axis between said first and second ends, and an axial bore surface forming a single axial bore wherein the axial bore surface is less compressible than the leader;
wherein the insert further comprises a flange extending out from and around the longitudinal portion, perpendicularly to said longitudinal axis, so that the flange extends through the main body to at or near an outer surface of the main body, and wherein the flange is adapted to prevent axial movement of the insert relative to the main body and to prevent rotation of the insert relative to the main body;
wherein the longitudinal portion is adapted to prevent rotation of the insert relative to the main body by having an outer surface comprising axial ridges extending parallel to the longitudinal axis all or substantially along a length of the longitudinal portion; and
wherein the leader extends through the bore, and said float is secured to the leader by being slid axially on said leader toward said butt end to a location where said float is immovable on the leader only by means of an interference fit between the axial bore surface and the tapered, axial outer surface of the leader, wherein the interference fit comprises compression of the leader by the axial bore surface, and the float does not comprise any member in the bore except said leader.

2. A combination as in claim 1 that does not comprise any rubber grommet contacting the float and does not comprise any rubber grommet contacting the leader.

3. A combination as in claim 1, wherein said bore has an enlarged region at one end of the float for forming an enlarged end opening.

4. A combination as in claim 1, wherein the leader is a knotless leader that, in said location wherein said float is immovable on the leader, extends continuously through said bore.

5. A combination as in claim 1, wherein said leader comprises a knot, and, in said location wherein said float is immovable on the leader, the knot is outside of the bore.

6. A combination as in claim 1, wherein the main body is a truncated cone shape, with generally flat opposing ends.

7. A combination as in claim 1, wherein the main body is closed-cell foam and the insert is a rigid and smooth polymer that is non-compressible.

8. A combination as in claim 7, wherein the main body is closed-cell polystyrene.

9. A combination as in claim 7, wherein the insert is polypropylene.

10. A combination as in claim 1, wherein the leader comprises a knot, the float has a length parallel to said longitudinal axis and a radius perpendicular to said length, and the float further comprises an axial side-slot extending along the length of the float from an outermost surface of the outer surface of the main body, through the main body and the insert and into the bore, for radial insertion of a first portion of the leader through the side-slot into the bore before the float is slid axially on the leader to a second portion of the leader at said location, wherein both the first portion and second portion are between the knot and the butt end so that the knot is not received in the bore.

11. A combination as in claim 10, wherein the bore has a bore diameter and the side-slot has a width that is smaller than the bore diameter.

12. A combination as in claim 10, wherein said flange is generally centered between said first and second ends of the elongated longitudinal portion.

13. A combination as in claim 1, wherein the flange is adapted to prevent axial movement of the insert relative to the main body by having a radial top surface perpendicular to said longitudinal axis and nearer said first end, and a radial bottom surface perpendicular to said longitudinal axis and nearer said second end, wherein the main body extends radially along said top surface and said bottom surface.

14. A combination as in claim 1, wherein said flange is generally centered between said first and second ends of the elongated longitudinal portion.

15. A fishing leader and float combination comprising:
  a tapered fly-fishing leader having a tip end with a diameter, a butt end with a diameter, and a tapered, axial outer surface extending from said tip end to said butt end, wherein the tip end diameter is smaller than the diameter of the butt end;
  a float attached to said leader, the float comprising a main body of compressible material formed around an insert of different material than the main body, wherein the insert comprises an elongated longitudinal portion having a first end and a second end and a longitudinal axis between said first and second ends, and an axial bore surface forming a single axial bore wherein the axial bore surface is less compressible than the leader;
  wherein the insert further comprises a flange extending out from and around the longitudinal portion, perpendicularly to said longitudinal axis, so that the flange extends through the main body to at or near an outer surface of the main body, and wherein the flange is adapted to prevent axial movement of the insert relative to the main body and to prevent rotation of the insert relative to the main body;
  wherein the leader extends through the bore, and said float is secured to the leader by being slid axially on said leader toward said butt end to a location wherein said float is immovable on the leader only by means of an interference fit between the axial bore surface and the tapered, axial outer surface of the leader, wherein the interference fit comprises compression of the leader by the axial bore surface, and the float does not comprise any member in the bore except said leader;
  wherein said flange is adapted to prevent rotation of the insert relative to the main body by said flange having a radial top surface perpendicular to said longitudinal axis and nearer said first end, and a radial bottom surface perpendicular to said longitudinal axis and nearer said second end, and apertures extending axially through the flange parallel to said longitudinal axis from said top surface to said bottom surface, wherein the main body extends through said apertures from the top surface to the bottom surface.

16. A combination as in claim 15, wherein said apertures are spaced apart on the flange all around the longitudinal portion.

17. A combination as in claim 15 that does not comprise any rubber grommet contacting the float and does not comprise any rubber grommet contacting the leader.

18. A combination as in claim 15, wherein said bore has an enlarged region at one end of the float for forming an enlarged end opening.

19. A combination as in claim 15, wherein the leader is a knotless leader that, in said location wherein said float is immovable on the leader, extends continuously through said bore.

20. A combination as in claim 15, wherein said leader comprises a knot, and, in said location wherein said float is immovable on the leader, the knot is outside of the bore.

21. A combination as in claim 15, wherein the longitudinal portion is adapted to prevent rotation of the insert relative to the main body by having an outer surface comprising axial ridges extending parallel to the longitudinal axis all or substantially along a length of the longitudinal portion.

22. A combination as in claim 15, wherein the main body is a truncated cone shape, with generally flat opposing ends.

23. A combination as in claim 15, wherein the main body is closed-cell foam and the insert is a rigid and smooth polymer that is non-compressible.

24. A combination as in claim 23, wherein the main body is closed-cell polystyrene.

25. A combination as in claim 23, wherein the insert is polypropylene.

26. A combination as in claim 15, wherein the leader comprises a knot, the float has a length parallel to said longitudinal axis and a radius perpendicular to said length, and the float further comprises an axial side-slot extending all along the length of the float from an outermost surface of the outer surface of the main body, through the main body and the insert and into the bore, for radial insertion of a first portion of the leader through the side-slot into the bore before the float is slid axially on the leader to a second portion of the leader at said location, wherein both the first portion and second portion are between the knot and the butt end so that the knot is not received in the bore.

27. A combination as in claim 26, wherein the bore has a bore diameter and the side-slot has a width that is smaller than the bore diameter.

28. A combination as in claim 15, wherein the flange is adapted to prevent axial movement of the insert relative to the main body by having said radial top surface perpendicular to said longitudinal axis and nearer said first end, and said radial bottom surface perpendicular to said longitudinal axis and nearer said second end, wherein the main body extends radially along said top surface and said bottom surface.

29. A combination as in claim 15, wherein said flange is generally centered between said first and second ends of the elongated longitudinal portion.

* * * * *